United States Patent
Johnson et al.

(10) Patent No.: US 8,996,423 B2
(45) Date of Patent: Mar. 31, 2015

(54) AUTHENTICATION FOR A COMMERCIAL TRANSACTION USING A MOBILE MODULE

(75) Inventors: Bruce E. Johnson, Bellevue, WA (US); Chung Webster-Lam, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1764 days.

(21) Appl. No.: 11/379,143

(22) Filed: Apr. 18, 2006

(65) Prior Publication Data

US 2006/0235796 A1    Oct. 19, 2006

Related U.S. Application Data

(63) Continuation of application No. 11/379,133, filed on Apr. 18, 2006, now abandoned, which is a continuation-in-part of application No. 11/376,535, filed on Mar. 15, 2006, now Pat. No. 7,849,020.

(60) Provisional application No. 60/672,754, filed on Apr. 19, 2005.

(51) Int. Cl.
  *G06F 21/00*    (2013.01)
  *G06Q 20/02*    (2012.01)
  (Continued)

(52) U.S. Cl.
  CPC ............ *G06Q 20/3829* (2013.01); *G06Q 20/02* (2013.01); *G06Q 20/40* (2013.01);
  (Continued)

(58) Field of Classification Search
  USPC ...................................... 705/50–79
  See application file for complete search history.

(56) References Cited

U.S. PATENT DOCUMENTS 4,906,826 A    3/1990 Spencer
5,671,279 A    9/1997 Elgamal
(Continued)

FOREIGN PATENT DOCUMENTS

CN    1726686    1/2006
DE    19630920    10/1997
(Continued)

OTHER PUBLICATIONS

Office Action dated Sep. 2, 2008 cited in U.S. Appl. No. 11/379,133.
(Continued)

*Primary Examiner* — Calvin L Hewitt, II
*Assistant Examiner* — Tim Hale
(74) *Attorney, Agent, or Firm* — Kevin Sullivan; Brian Haslam; Micky Minhas

(57) ABSTRACT

Current embodiments provide for authorization and payment of an online commercial transaction between a purchaser and a merchant including verification of an identity of the purchaser and verification of an ability of the purchaser to pay for the transaction, where the identity provider and the payment provider are often different network entities. Other embodiments also provide for protocols, computing systems, and other mechanisms that allow for identity and payment authentication using a mobile module, which establishes single or multilevel security over an untrusted network (e.g., the Internet). Still other embodiments also provide for a three-way secure communication between a merchant, consumer, and payment provider such that sensitive account information is opaque to the merchant, yet the merchant is sufficiently confident of the consumer's ability to pay for requested purchases. In yet another embodiment, electronic billing information is used for authorization, auditing, payment federation, and other purposes.

22 Claims, 13 Drawing Sheets

(51) Int. Cl.
*G06Q 20/40* (2012.01)
*G06Q 30/06* (2012.01)
*G06Q 20/32* (2012.01)
*G06Q 20/12* (2012.01)
*G06Q 20/42* (2012.01)
*G06Q 20/38* (2012.01)
*G06Q 30/02* (2012.01)

(52) U.S. Cl.
CPC ........ *G06Q30/0601* (2013.01); *G06Q 20/4014* (2013.01); *G06Q 20/32* (2013.01); *G06Q 20/12* (2013.01); *G06Q 20/425* (2013.01); *G06Q 20/3229* (2013.01); *G06Q 30/02* (2013.01); *G06Q 20/322* (2013.01)
USPC .............................................. 705/71; 705/50

(56) References Cited

U.S. PATENT DOCUMENTS

| | | | |
|---|---|---|---|
| 5,724,424 | A | 3/1998 | Gifford |
| 5,812,668 | A | 9/1998 | Weber |
| 5,892,900 | A | 4/1999 | Ginter |
| 6,108,644 | A | 8/2000 | Goldschlag |
| 6,327,578 | B1 | 12/2001 | Linehan |
| 6,434,238 | B1 | 8/2002 | Chaum |
| 6,731,731 | B1 * | 5/2004 | Ueshima ........................ 379/196 |
| 6,792,536 | B1 | 9/2004 | Teppler |
| 6,799,155 | B1 * | 9/2004 | Lindemann et al. ............ 703/24 |
| 7,003,789 | B1 | 2/2006 | Linehan |
| 7,107,620 | B2 | 9/2006 | Haverinen |
| 7,133,920 | B2 * | 11/2006 | Tsujisawa ..................... 709/229 |
| 7,152,045 | B2 | 12/2006 | Hoffman |
| 7,171,694 | B1 | 1/2007 | Jepersen |
| 7,203,158 | B2 * | 4/2007 | Oshima et al. ................ 370/208 |
| 7,366,703 | B2 | 4/2008 | Gray |
| 7,624,267 | B2 * | 11/2009 | Huang et al. .................. 713/168 |
| 2001/0051902 | A1 | 12/2001 | Messner |
| 2002/0026374 | A1 * | 2/2002 | Moneymaker et al. ......... 705/26 |
| 2002/0032663 | A1 | 3/2002 | Messner |
| 2002/0120563 | A1 | 8/2002 | McWilliam |
| 2002/0123972 | A1 | 9/2002 | Hodgson |
| 2002/0129088 | A1 | 9/2002 | Zhou et al. |
| 2002/0138445 | A1 | 9/2002 | Laage |
| 2002/0147820 | A1 | 10/2002 | Yokote |
| 2003/0005290 | A1 | 1/2003 | Fishman et al. |
| 2003/0061172 | A1 | 3/2003 | Robinson |
| 2003/0069792 | A1 | 4/2003 | Blumenthal |
| 2003/0163423 | A1 | 8/2003 | Holst-Roness |
| 2003/0172090 | A1 | 9/2003 | Asunmaa et al. |
| 2004/0030645 | A1 | 2/2004 | Monaghan |
| 2004/0180657 | A1 * | 9/2004 | Yaqub et al. ................ 455/435.1 |
| 2004/0249750 | A1 | 12/2004 | Granzer |
| 2005/0114261 | A1 | 5/2005 | Lin |
| 2005/0278547 | A1 | 12/2005 | Hyndman et al. |
| 2006/0020550 | A1 * | 1/2006 | Fields et al. .................... 705/51 |
| 2006/0048236 | A1 * | 3/2006 | Multerer et al. ................ 726/28 |
| 2006/0218396 | A1 * | 9/2006 | Laitinen et al. ............... 713/167 |
| 2006/0235761 | A1 | 10/2006 | Johnson |
| 2006/0235795 | A1 | 10/2006 | Johnson |
| 2007/0055873 | A1 * | 3/2007 | Leone et al. .................. 713/168 |
| 2008/0046988 | A1 * | 2/2008 | Baharis et al. .................... 726/7 |

FOREIGN PATENT DOCUMENTS

| | | |
|---|---|---|
| GB | 2406925 | 4/2005 |
| JP | 2000036000 | 2/2000 |
| JP | 2002207929 | 7/2002 |
| JP | 2003123008 | 4/2003 |
| JP | 2003168035 | 6/2003 |
| JP | 2003534593 | 11/2003 |
| RU | 2182725 | 5/2005 |
| WO | 2005022428 | 3/2005 |

OTHER PUBLICATIONS

Office Action dated Mar. 4, 2009 cited in U.S. Appl. No. 11/379,133.
Derfler, "How Networks Work", Best-seller Edition, 1996, Ziff-Davis Press, Eneryville, CA, all pages.
White, "How Computers Work", Millennium Edition, 1999, Que Corporation, Indianapolis, IN, all pages.
Gralla, "How the Internet Works", Millennium Edition, 1999, Que Corporation, Indianapolis, IN, all pages.
Muller, "Desktop Encyclopedia of the Internet", 1999, Artech House Inc., Norwood, MA, all pages.
"The Bank Credit Card Business", American Bankers Association, 1996, All Pages.
Office Action dated Aug. 25, 2009 cited in U.S. Appl. No. 11/379,133.
Office Action dated Dec. 9, 2009 cited in U.S. Appl. No. 11/379,133.
Huber, "An Experimental Study of a Business Domain Independent Application Level and Internet Access Authentication and Authorization Concept" International Conference on Mobile Business (ICMB '05) Jul. 2005.
Khu-Smith V., Mitchel C. J. : "Using GSM to Enhance e-Commerce Security" WMC '02 Proceeding of the 2nd International Workshop on Mobile Commerce, 2002 pp. 75-81.
Ahmad A. et al: "SIM-based WLAN Authentication for Open Platforms" Intel Technology Journal, XX, US Aug. 1, 2003 pp. 1-9.

* cited by examiner

AUTHENTICATION FOR A COMMERCIAL TRANSACTION USING A MOBILE MODULE

CROSS-REFERENCE TO RELATED APPLICATIONS

This application is a continuation of U.S. patent application Ser. No. 11/379,133 filed on Apr. 18, 2006 now abandoned, entitled SECURE NETWORK COMMERCIAL TRANSACTIONS by Johnson, et al., which claims the benefit of U.S. Provisional Application 60/672,754, filed Apr. 19, 2005, entitled "METHODS AND APPARATUS FOR NETWORK TRANSACTIONS," which applications are incorporated herein by reference in their entireties. This application is also a continuation-in-part of U.S. patent application Ser. No. 11/376,535 filed Mar. 15, 2006, entitled "METHOD AND APPARATUS FOR NETWORK TRANSACTIONS", by Johnson, which issued as U.S. Pat. No. 7,849,020 on Dec. 7, 2010, which claims the benefit under 35 U.S.C. §119(e) of U.S. Provisional Application 60/672,754 filed Apr. 19, 2005, entitled "METHODS AND APPARATUS FOR NETWORK TRANSACTIONS," by Johnson, all of which are incorporated herein by reference in their entireties.

FIELD OF THE INVENTION

The present invention relates to networked transaction systems and methods for conducting online transactions.

BACKGROUND

The proliferation of networked computer systems has opened up new possibilities with respect to how corporations and individuals conduct business. For example, end-users connected to a network, (e.g., the Internet), via a networked device such as a computer, PDA, cellular phone, etc., may conduct commercial transactions over the network to purchase services and/or merchandise, conduct financial transactions, or otherwise conduct business or perform personal transactions over the network. An inherent problem linked with online transactions is security, particularly when the transfer of moneys, funds and/or financial, personal or other confidential information is involved in the transaction.

Many conventional online transactions are conducted according to one of two different, but related, models. Both models employ a browser as the interface for handling information transfer between parties involved in the transaction. In the first model, a merchant offers goods or services online via a browser. The term "merchant" refers herein generally to any entity offering goods and/or services for purchase. The term merchant is not used to describe any particular commercial status or to describe a licensed seller, unless specifically stated. Rather, the term describes generically any seller or entity offering good and/or services for purchase or sale. The term service provider is used herein interchangeably with the term merchant and, unless otherwise stated, have the same meaning.

In a conventional online transaction, a merchant may have a website that describes, displays or otherwise offers goods and/or services for sale. An end-user indicates a desire to purchase one or more goods or services, typically by selecting the item via the browser interface. The browser then displays a transaction page that allows the end-user to select one or more payment types and to input information needed to complete the transaction. For example, the transactional page displayed by the browser may permit the end-user to select a payment type, such as credit card (e.g., VISA, MasterCard, American Express, etc.) and to input transactional information such as credit card number, card expiration date, etc. The transactional page may also query the end-user for personal information such as name, billing address, shipping address, etc. The end-user then submits the information and the merchant processes the submitted information.

In this first model, the merchant typically "owns" the website. That is, the merchant maintains the website, is responsible for the content, and receives and processes the transactional information provided by the end-user. The merchant may establish an account with the end-user before conducting the first transaction and the end-user may then access that account via a user established login and password each time the end-user conducts a transaction with the merchant. That is, the end-user typically chooses a login name and a password to be used in subsequent sessions or transactions. After the end-user has submitted the information queried by the transactional page(s), the merchant processes the information to make sure the information is sufficient to complete the transaction. For example, the merchant may ensure that the credit card number is valid and has sufficient funds to cover the cost of the goods and/or services.

The second model typically includes a third party transaction provider that handles the payment portion of the transaction. The third party forms a relationship with both the end-user and the merchant. In particular, the end-user may establish an account with the third party that can be accessed via a login and password as discussed above. To establish the account, the end-user may provide personal and payment information to the third party (i.e., the end-user may provide personal information identifying the user and payment information such as one or more credit card numbers, expiration dates, etc.) The end-user may also establish an electronic funds account by providing money to the third party transaction provider, the balance of which can be used to purchase online goods and/or services. The third party archives the account information provided by the end-user and/or maintains the end-user's balance.

The third party also establishes a relationship with the merchant, wherein the third party handles the payment processing of the transaction. In particular, the third party agrees to make payments to the merchant when an end-user with an account requests a transfer of funds to make a purchase. The merchant may provide the option of using the third party by signaling the availability of this option on its website where the goods and services are being sold. For example, when a user visits a merchant's website and decides to make a purchase, the user may then be presented with an option to pay for the purchase using the third party transaction provider.

When the end-user selects the option to pay for the purchase using the third party transaction provider, the end-user's browser is redirected to a website belonging to the third party transaction provider. The end-user then logs into his/her account via the login/password combination and selects a payment type (e.g., credit card) to use in the transaction, or requests a transfer of funds from the user's funds account to the merchant's account. Once the merchant determines that payment has been transferred appropriately by the transaction provider, the merchant can proceed to ship the purchased product or provide the purchased service to the end-user. In the second model, the third party is responsible for maintaining end-user personal and financial information and for processing the transaction.

SUMMARY

Conventional online transactions, for example, the purchase of goods and/or services over a network, are vulnerable to security breaches resulting in loss of personal, financial and/or other confidential information. Moreover, in an untrusted network (e.g., the Internet), both merchants and purchasers are at risk for entering into a transaction with a bad actor such that one side of the bargain is not upheld. Conventional online transaction models may also require a merchant to archive purchaser's confidential information and may require them to handle payment aspects of the transaction. In addition, conventional online transaction models are awkward for the purchaser and produce a generally unintuitive transaction experience. For example, conventional online transactions are conducted via a browser using a login/password paradigm that is confusing and difficult to manage.

Applicant has identified and appreciated that delegating at least some of the transactional responsibilities handled by the purchaser and browser in conventional models to lower level systems (and away from the browser and end-user), may facilitate a simpler and more secure online commercial transactions framework. For example, one or more transactional tasks may be handled by the operating system at one or both of the end-user and merchant, where information may be more securely safeguarded. By embedding one or more tasks in the operating system, users may be relieved of some of the burden of transferring transactional information, making the experience more intuitive and enhancing security. Moreover, the merchant may be relieved of maintaining purchaser information, handling of payment information and/or processing the transaction.

Applicant has further appreciated that problems associated with validating the identity of a purchaser may be mitigated by exploiting technologies more secure and convenient than the login/password model. In one embodiment, identity information about a purchaser is provided by a subscriber identity module (SIM) card which stores identity information about the end-user that can be issued programmatically, creating a less confusing and more straightforward purchasing experience. Moreover, embodiments herein provide for protocols, methods, computing systems, and other mechanisms configured for single or multilevel authentication using a SIM device over an otherwise untrusted or unsecure network (e.g., the Internet).

Applicant has further appreciated that providing various transactional elements of online commercial transactions using generally disinterested third parties mitigates risks involved for both the purchaser and the merchant. In one aspect of the invention, a commercial transaction system is provided wherein a first network entity provides verification of a purchaser's identity and a different network entity provides verification of a user's ability to pay for the purchase, such that a merchant and a purchaser that are strangers to one another may conduct a transaction in relative security.

Still other embodiments allow for a three-way secure commercial transaction between a merchant, consumer, and payment provide in such a way that sensitive billing account information is opaque to the merchant or third parties. In such an embodiment, payment tokens are passed via the consumer between the merchant and payment provider. Such payment tokens are encrypted or signed in such a way that the merchant and others do not control or obtain any sensitive account information for the consumer. Nevertheless, the merchant can still confidently validate the payment token indicating the consumer's ability to pay for services and/or goods provided.

In another embodiment, electronic billing information is used for payment authorization, auditing, and other purposes. In this embodiment, various network entities (e.g., the consumer, merchant, payment provider, etc.) are provided with a machine readable electronic bill, which is used to automatically request and validate payment, create a transaction history, present a more accurate description of paid for services/goods, and for other purposes in an online commercial transaction. This billing information may also be used for payment federation of a single payment from a consumer to various business associates for the merchant. For example, the merchant may have a contractual relationship with various business associates that provide services and/or goods in the commercial transaction. The electronic billing information can include those portions of payments that are to be distributed among the various associates such that payment federation can automatically occur without any need for user interaction or separate auditing and payment mechanisms.

Provided herein are also mechanisms for automated decisions of a commercial transaction using rules or constraints defined by any number of network entities including the consumer, merchant, payment provider, etc. For example, payment options accepted by the merchant may be compared with payment options available to the consumer. Based on such comparison, the consumer may be presented only with those options that match. Alternatively, the payment option may automatically be chosen based on such comparison and/or based on additional rules or constraints. For instance, the consumer may limit the type of payments based on an established trust with the merchant. Of course, there may be many other types of rules and/or constraints that determine various actions that can occur in the commercial transaction.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
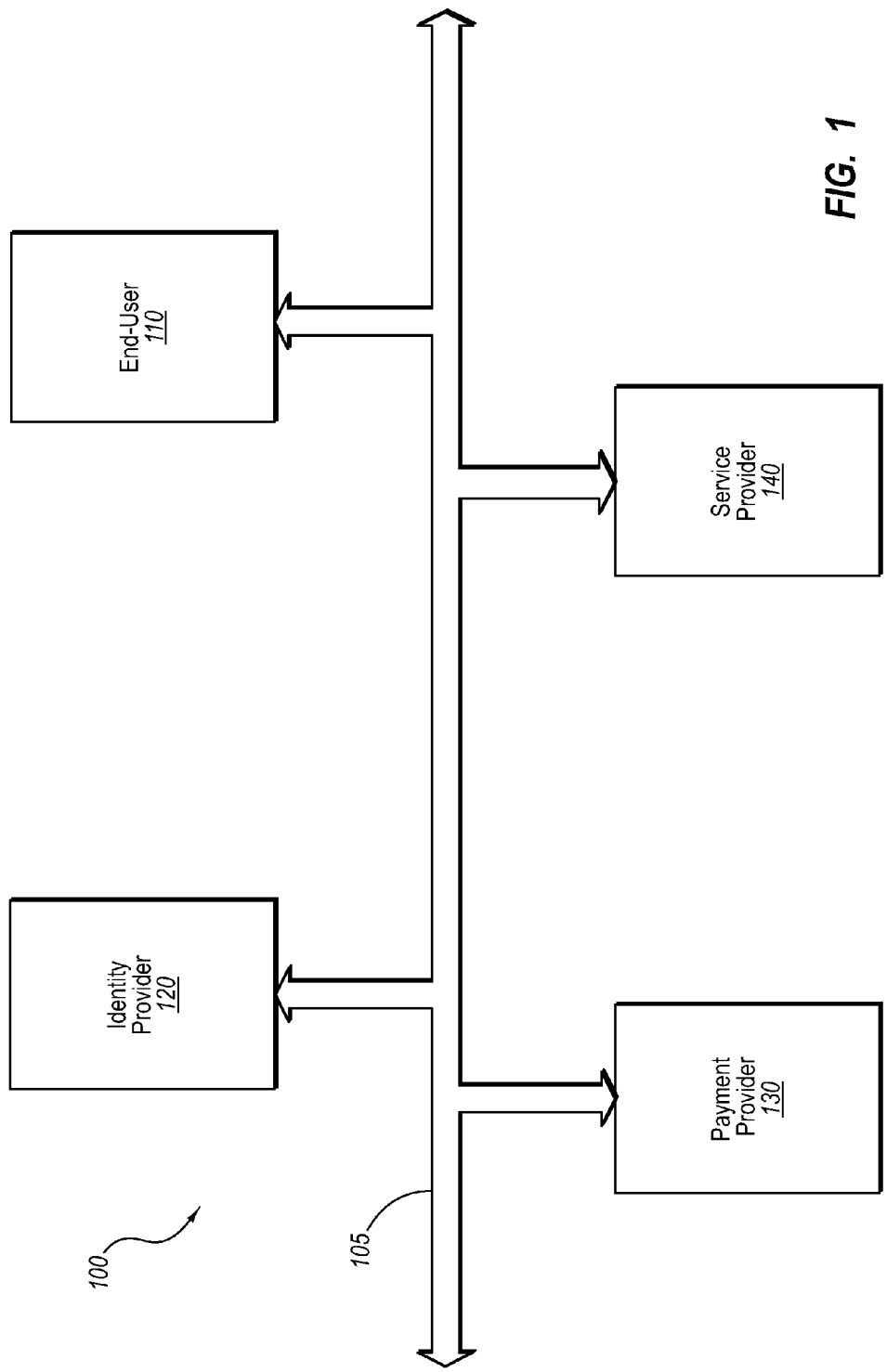
FIG. 1 illustrates a block diagram of a networked computer system for performing online transactions, in accordance with one embodiment of the invention.

Conventional models for networked commercial transactions focus on the browser as the interface for requesting and submitting personal and financial information between an end-user purchaser and a merchant or service provider, whether it be directly through the merchant or via a third party transaction provider. In the first instance, the merchant is burdened with creating and maintaining an infrastructure capable of querying, obtaining, handling and processing personal and financial information, typically with some minimum level of security. Moreover, the merchant may be responsible for maintaining accounts and account information for each of its customers (which typically includes both confidential personal and financial information).

A purchaser must relinquish personal information (e.g., name, address, phone number, etc.) and financial information (e.g., debit and credit card numbers and expiration dates, banking account numbers, etc.) to complete a transaction. At some level, the purchaser must trust that the merchant is an honest broker and will operate in good faith, using the information only as authorized. Likewise, a merchant must trust that a purchaser is who he/she represents and that the payment information provided is truly associated with the end-user making the purchase. There may be no sure way for a merchant to validate the identity of the purchaser and/or the validity of the payment information. In a distributed networked environment, purchasers may have to rely on the reputation of the merchant, which may limit the sources from which the purchaser is willing to conduct transactions. The merchant may have to operate with even less conviction that the purchaser is a good faith, bone fide purchaser. In an untrusted network, this model may present undue risks on one or both parties.

Even when an established and merited trust has developed between a purchaser and a merchant, databases storing customer information maintained by the merchant may be susceptible to hacking, information theft and even bad actors within an otherwise honest and trustworthy business. Third party transaction providers are also susceptible to electronic theft, security breaches, etc. More sophisticated "spyware" programs allow hackers to record keystrokes and obtain screen shots of computers that have been compromised, making browser based transactions particularly vulnerable to electronic theft. Accordingly, purchasers conducting online commercial transactions according to conventional methods and models may be vulnerable to dissemination and unauthorized use of their confidential personal and financial information.

Conventional commercial transaction models typically require a purchaser to establish an account with each merchant with which the purchaser wants to conduct a commercial transaction. Generally, the account is protected and accessed via a login name and password, requiring a purchaser to manage multiple login and passwords and maintain which login/password combination corresponds to which account. Some customers may resort to storing their login/password combinations locally on their computer, or using the same login/password combination for all accounts. Both attempts to manage multiple accounts are vulnerable to theft, hacking, and/or other security breaches.

For example, a customer is at risk of having all of his/her accounts breached should the single login/password combination be obtained by electronic theft. In addition to the inherent security risks associated with conventional login/password paradigms, purchasers may find the account login procedure an awkward transaction experience. In particular, having to login to an account when a purchase is desired makes the transaction less convenient, as a purchaser must, in one way or another, produce this information before a transaction can be completed. Moreover, with third party transaction providers, the purchaser is redirected from a merchant's website to the third party transaction provider's website. This step is not intuitive and, at best, is cumbersome and confusing to the purchaser.

Applicant has identified and appreciated that delegating at least some of the transactional responsibilities handled by the purchaser and browser in conventional models to lower level systems (and away from the browser and end-user), may facilitate a simpler and more secure online commercial transactions framework. In one embodiment, one or more transactional tasks are handled by the operating system (or some other trusted subsystem) at one or both of the end-user and merchant, where information may be more securely safeguarded. By embedding one or more tasks in the operating system, users may be relieved of some of the burden of transferring transactional information, making the experience more intuitive and enhancing security. Moreover, the merchant may be relieved of maintaining purchaser information, handling of payment information and/or processing the transaction.

Applicant has further appreciated that problems associated with validating the identity of the user may be mitigated by exploiting technologies more secure and convenient than the login/password model. In one embodiment, identity information about a purchaser is provided by a subscriber identity module (SIM) card which stores identity information about the end-user that can be issued programmatically. In another embodiment, identification information is provided by a smart card embedded or otherwise coupled to a network device from which a purchaser conducts an online commercial transaction. Use of any of various chip or card based identity means allows a purchaser to link his or her identity with a particular device, such as a cellular phone or a networked computer.

The term "programmatically" and/or "automatically" refers to actions performed substantially without manual or operator involvement. In particular, programmatic or automatic refers to actions initiated and/or performed by one or more computer programs. For example, providing identification information by requesting a user (e.g., purchaser) to provide login and/or password information would not be considered programmatic as the substance of the action is performed by the user. However, an action wherein a program issues identification information (e.g., a SIM number, network address hardware ID, etc.) without requesting the user to input the information would be considered programmatic. Note that such automatic operations may be implemented by either software or hardware components.

Applicant has further appreciated that distributing various transactional elements of online commercial transactions over different network devices, facilitates more secure commercial transactions over an untrusted network. In one embodiment, an identity provider and a payment provider, both separate and distinct network entities from the end-user, merchant and each other, provide verification support during a commercial transaction. The term "network entity" refers herein to a network presence and may be one or a combination of end-user/purchaser, identity provider, payment provider, merchant, etc. A network entity may have a presence on a network via one or multiple network nodes. For example, multiple networked devices may operate under the auspices of a single network entity, such as an identity provider utilizing multiple servers to conduct online business, or an end-user connected to a network via a cellular phone and a personal computer. A network entity may be a business such as a bank or retailer, or an individual such as an end-user.

In one embodiment, various elements of an online transaction are distributed over separate and independent network entities. For example, the identity provider may provide identity validation in the form of an identity token, which the merchant can use to verify the identity of the purchaser. The identity token may include one or more identity credentials of the end-user. The identity token may be issued based on the identity information provided by the end-user/purchaser, for example, the subscribe number from the SIM card, a network address (e.g., a Network Interface Card (NIC) identification, World Wide Name (WWN), etc.), login information, etc. Similarly, the payment provider may provide verification of the end-user's ability to pay in the form of a payment token. In addition, the payment provider may handle payment transactions on behalf of the purchaser in satisfaction of the purchase of goods and/or services from the merchant. The above described framework allows, inter alia, a purchaser and merchant that are strangers to conduct an online commercial transaction in an untrusted network environment in relative confidence, as discussed in further detail in the various exemplary embodiments provided below.

For example, one embodiment provides for a three-way secure communication between a merchant, consumer, and payment provider during a commercial transaction for purchasing services and/or goods in either an online or retail environment. As will be discussed in greater detail below, payment tokens are passed from the payment provider to the merchant via the consumer. Such payment tokens offer proof of the consumer's ability to pay for the service and/or goods by allowing the merchant to validate the authenticity of the token directly with the payment provider. Although such payment tokens uniquely identify the authorization of payment for the services and/or goods, sensitive information about the billing account for the consumer is either not included within the token or otherwise encrypted so as to be invisible to the merchant. Accordingly, the consumer's sensitive information is opaque to the merchant, thereby allowing the consumer to confidently purchase items from the merchant even when no trusted relationship exists between them. Further, because the merchant can validate the payment token directly with the payment provider, the merchant can deliver the items with confidence of the consumer's ability to pay for such services and/or goods without maintaining financial information about the consumer (e.g., credit card numbers, account information, etc.). In addition, because the payment provider can validate the authenticity of the payment token as coming from the consumer, the payment provider can confidently transfer funds to the merchant; thus completing the three-way secure commercial transaction.

As previously mentioned, other embodiments for the framework provided herein move portions of the transaction to more secure subsystems of a computing device (e.g., the operating system). This advantageously allows for numerous capabilities including: an abstraction model for allowing legacy applications to provide in-band online commercial transaction experience; additional types of fraud protection; bill capture and presentation for auditing, payment federation, and other payment or authentication purposes; service provider code execution for additional security and merchant specific functionality; multilevel authentication; and other features. For example, such abstraction model allows legacy and other applications to provide a user with an online purchase and payment capabilities as if such transaction occurs directly within the application, although portions of the commercial transaction are performed out-of-band. Examples, include catalog purchase (e.g., Amazon, Sears, etc.), direct purchase of multimedia content from within the multimedia application, download software/games in trial mode and automatically unlock them through in-band payment model, enable payment for subscription based services such as simple message service through email, etc.

Further, in another embodiment, the framework captures and presents electronic bills in the above three-way secure (and other) commercial transactions as a mechanism for additional authentication, auditing, payment federation, and other purposes will be described in greater detail below. Moreover, by moving the commercial transaction to more secure portions of the subsystem, other embodiments allow a merchant to run specific code on a machine (e.g., additional user authentication, payment rules/mechanisms, user experience, etc.) with confidence that such code will not be hacked or otherwise compromised. Of course, as described in greater detail below, Applicant has further realized other advantageous features through the use of the abstraction model provided herein.

In another embodiment, Applicant also provides for an overall system and protocol that uses a mobile module for secure communication and authentication of identity and payment capabilities for a variety of different services. For example, a subscriber identity module (SIM) (or other similar mobile module) can be used to authenticate a user and/or device to a service or server in a multilevel validation environment. In such embodiment, the mobile module (and possibly even the user) is authenticated over a network independent of the network mobile infrastructure for the mobile module. Thus, the system validates the possession of a mobile module through authentication of an active billing account with the mobile infrastructure. This establishes a secure communication with a computing device connected to the mobile module and a service (e.g., a Web Services (WS)) using existing secure protocols (e.g., WS-Authentication, WS-Security, and other similar protocols). Such secure communication can also be used to authenticate the user through other protocols and data exchanges between the mobile module and the mobile infrastructure—as described in greater detail below. Further, other embodiments provide for a protocol and state machine that abstract the computing device (used in the communication over the independent network) from the mobile infrastructure. Accordingly, the mobile module itself becomes a mobile terminal and the computing device becomes a peripheral device, thus complying with current wireless standards such as 3GPP (3rd Generation Partnership Project).

FIG. 1 illustrates a block diagram of a commercial transaction system 100, comprising a plurality of network nodes including an end-user (purchaser) computer 110, a merchant computer 140, an identity provider computer 120, and a payment provider computer 130. Each of the above nodes may include one or more computing devices interconnected via network 105. It should be appreciated that the end-user computer, merchant 140, identity provider 120 and payment provider 130 may be associated with a network entity, such as an individual, company or business. For example, end-user computer 110 typically is associated with an individual that employs the computer to access resources on the network and merchant computer 140 may be associated with a corporation or business offering goods and/or services for sale. The one or more computing devices that form each mentioned component in commercial transaction system 100 may operate as the point of entry, computing platform and/or vehicle by which the associated network entities communicate over the network.

Note that although embodiments provided herein may be described in an online purchasing environment, embodiments can also be used in a direct retail transaction. For example, the above and following description of a commercial transaction can apply to a consumer purchasing products in a retail store, wherein payment, identity, authorization, and other embodiments are used. Accordingly, the use of an online experience for describing embodiments herein is for illustrative purposes only and is not meant to limit or otherwise narrow the scope of embodiment unless otherwise explicitly claimed.

Also note that network 105 may be any type of network in any type of configuration that interconnects and allows nodes connected to the network to communicate. Nodes or devices may be connected to the network via copper (e.g., Category 5) cable, optical connections, wireless or any combination thereof. Information may be transferred using any low level protocol such as Ethernet and/or any information protocol such as TCP/IP. The network 105 may have any number of devices connected to it and may be a trusted (e.g., intranet) or an untrusted network (e.g., LAN/WAN, Internet, etc.), or a combination of both. The computers connected to the network may be any type of device including, but not limited to, one or any combination of a mobile phone, a desktop computer, a tablet personal computer, a server, workstation, etc.

Figure 2:
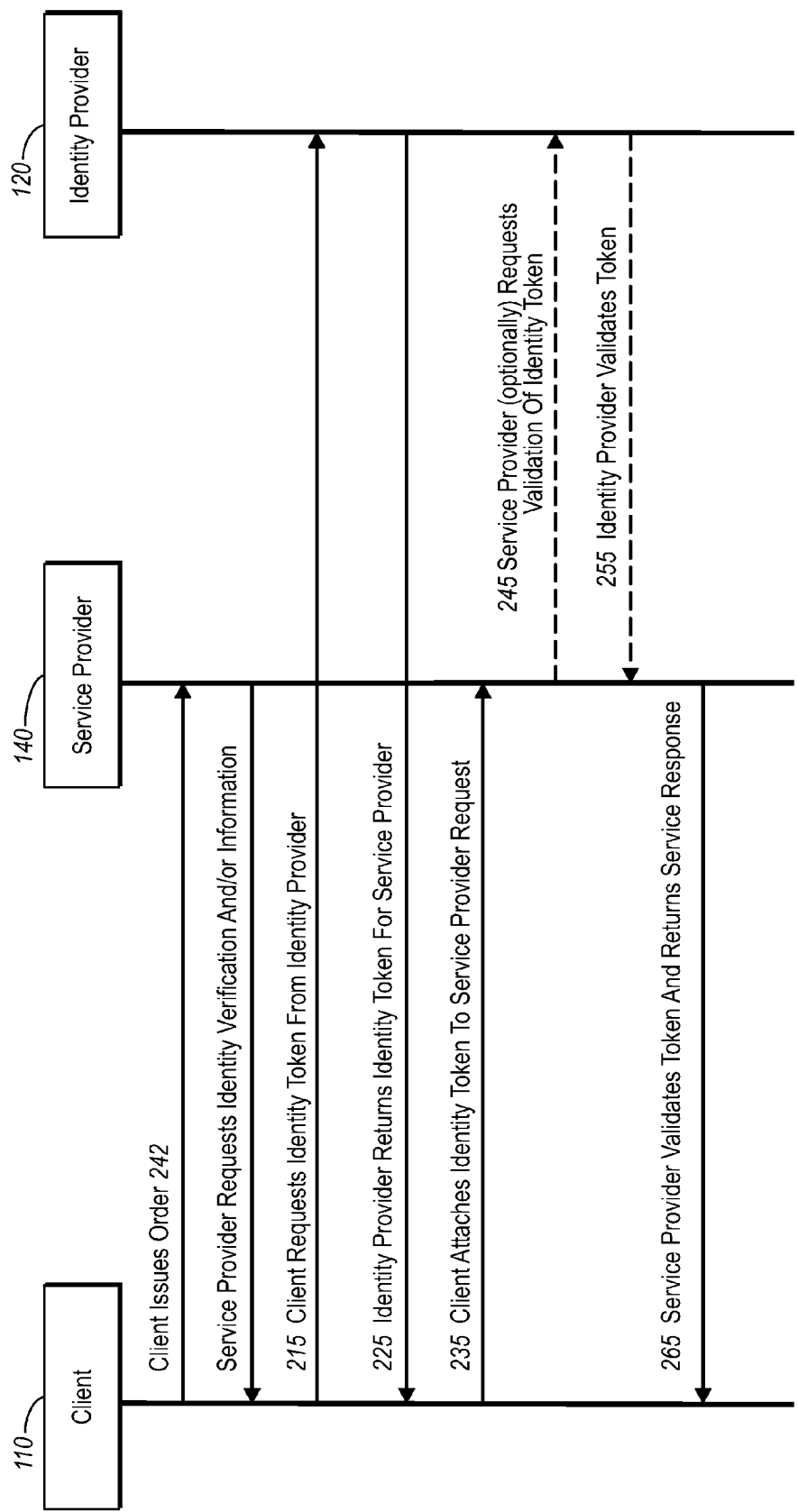
FIG. 2 illustrates a diagram of a system and method for initiating and performing identity verification in an online transaction, in accordance with one embodiment of the invention.
Figure 3:
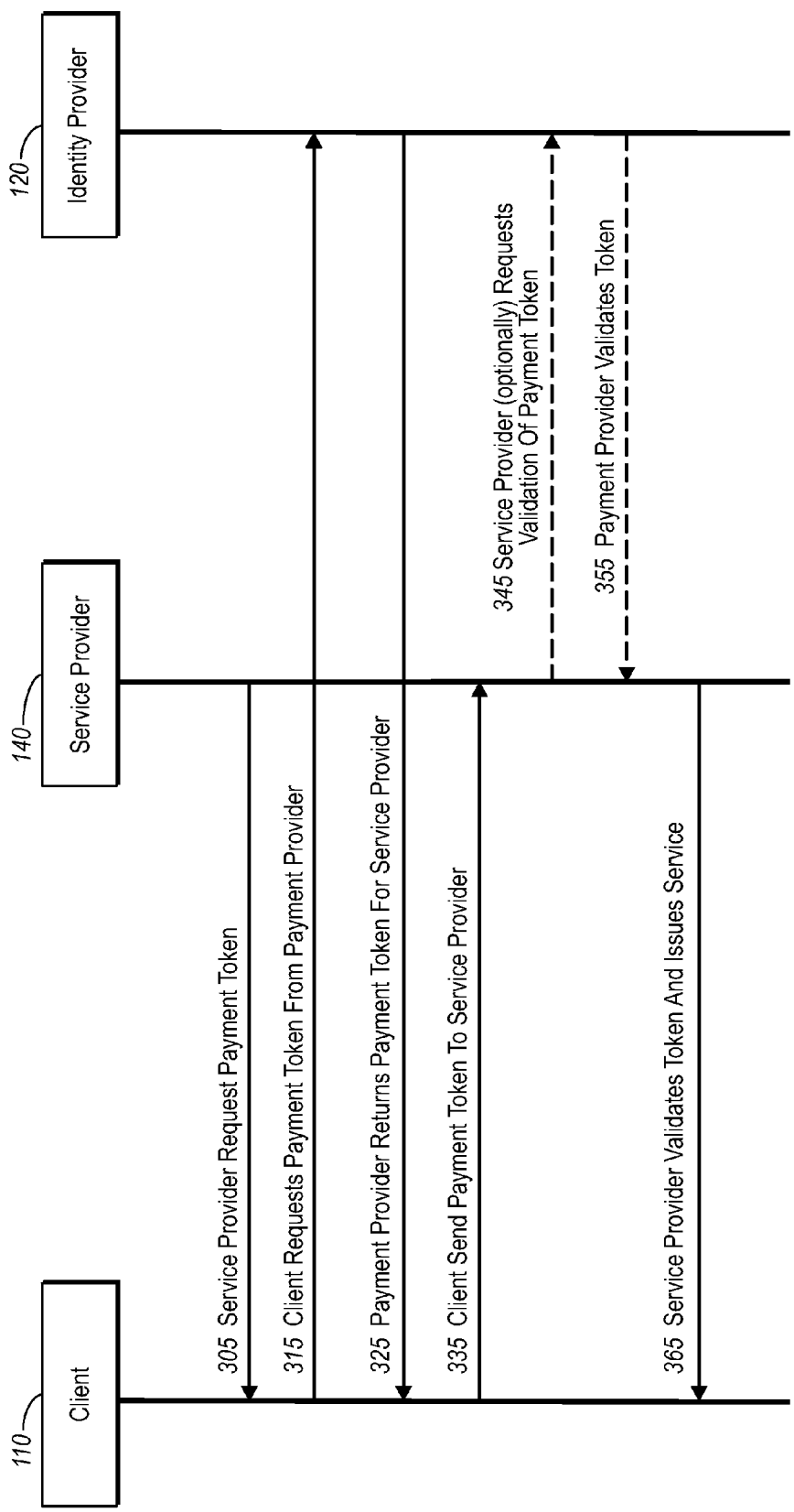
FIG. 3 illustrates a diagram of a system and method for performing payment negotiation, verification and/or certification in an online transaction, in accordance with one embodiment of the invention.

FIG. 2 illustrates a diagram of a system and method for initiating and performing identity verification in an online transaction, in accordance with one embodiment of the invention, and FIG. 3 illustrates a diagram of a system and method for performing payment negotiation, verification and/or certification in an online transaction, in accordance with one embodiment of the invention. The methods may be used separately or in combination to perform an online transaction between an end-user/purchaser and a merchant. In the following description, unless specifically pointed out, no distinction is made between the network entity and its associated networked devices. For example, "identity provider" is used generically to describe the identity provider as an entity (e.g., a bank, government organization, agency, etc.) and as the computing devices that the entity utilizes to perform various network functions, such as providing identity verification for an end-user, or otherwise operating on the entity's behalf.

An end-user computer 110 may place an order 242 with a merchant 140. The order 242 may be any indication that the end-user would like to purchase one or more goods and/or services from the merchant 140. For example, the order 242 may result from end-user selecting a good or service via a web browser displaying pages resident at the website of a merchant, or may result from choosing an option from an application running locally, as described in further detail below. As an example of the first instance, the merchant 140 may provide a website to display or otherwise offer for sale goods and/or services that it provides, or may provide an online catalog of merchandise. The order 242 may be any type of indication that end-user would like to purchase one or more goods and/or services from the merchant 140.

As an example of the second instance and as an alternative to selecting one or more goods and services from a merchant's website, order 242 may originate from an application or other program local to the end-user computer 110. For example, an end user may create, produce or edit a document via a word processing application, design a slide show using a presentation application and/or manipulate images or graphics for a poster or brochure using an imaging application. The application may include an option under the print menu that allows the document to be printed by a third party to, for example, take advantage of printing features that may not be locally available, or to otherwise exploit professional printing services. When the option is selected, the application may send, via the network, order 242 to the merchant 140. It should be appreciated that order 242 may be any indication to purchase any good and/or service, as the aspects of the invention are not limited in this respect.

In response to order 242, merchant 140 may request that end-user 110 provide an indication of the end-user's identity and/or verification that the end-user is indeed who he/she purports to be (step 205). For example, merchant 140 may not know anything about the source of order 242 and may desire information about the identity of the end-user and/or assurance that the end-user is not spoofing his/her identity. Alternatively, the merchant 140 may send a notice or indication that payment is required for the service and demand that a payment token be provided. To obtain a payment token, it may be necessary to first establish an identity via an identity token, as described in further detail below. In either case, end-user 110 may respond to the request by the merchant 140 by enlisting the services of identity provider 120 (step 215).

To obtain an identity token, end-user 140 provides identity information to identity provider 120. Identity information may include any information that enables the identity provider 120 to distinguish between end-user utilizing end-user computer 110 and the various other end-users to which identity provider may provide services. For example, the identity information may include a unique identifier associated with the hardware of end-user computer 110. In one embodiment, the identity information is provided by a SIM card issuing an identifier unique to the subscriber. Identity information may include providing a unique hardware number of the network interface card (NIC) of the end-user computer 110, a world wide name (WWN) or other network address of end-user computer 110 or any other means by which end-user computer 110 may be identified, including (in some embodiments) an established login name/password combination.

Identity provider 120 uses the identity information to locate identity credentials associated with the end-user. For example, identity provider 120 may include a database that stores identity information and credentials on a plurality of end-users. The identity information may be used to index into the database to obtain the correct identity credentials. The identity provider 120 may be any type of entity. For example, identity provider 120 may be a mobile phone company that uses the subscriber number provided by the end-user's SIM card to locate the appropriate identification information. In one embodiment the subscriber number is used to locate and obtain information provided by the end-user at the time of subscription to the cell-phone or other device exploiting SIM technology. The identity provider 120 may be a bank, a government agency (such as the registry of motor vehicles (RMV)), or any other facility that maintains identification information or credentials associated with end-users.

In response to the identity information provided by the end-user, identity provider 120 provides an identity token to end-user computer 110 that provides identity authentication and/or credentials about the end-user (step 225). The identity token may be any type of electronic message that another network device can use to authenticate, verify and/or determine an end-user's identity. For example, the identity token may include identity credentials of the end-user. Identity credentials may include, but are not limited to, any one of or combination of name, birth date, address, telephone number, email address, etc.

The identity token may include an electronic signature from the identity provider 120 certifying that the identity credentials are correct. In this way, a merchant and/or payment provider may rely on a disinterested third party (i.e., an identity provider), rather than the representations of an arbitrary end-user. The identity token may be encrypted before being transmitted over the network and decrypted when received by the desired network device (e.g., merchant, payment provider, etc., as discussed in further detail below), to protect against eavesdroppers on the network. In other embodiments, the payment token is merely a certification of the end-user's identity without accompanying identity information.

The identity provider 120 may transmit the identity token to end-user computer 110 to forward to merchant 140 (step 235), and/or identity provider 120 may transmit the identity token directly to the merchant 140. Merchant 140 may then process the identity token to identify end-user and/or to verify that end-user is who he/she purports to be. The identity token may be used to authenticate certain information about the end-user that may affect the transaction. For example, the merchant 140 may provide a service that requires the end-user to be of a certain age. Identity credentials transmitted with the identity token may be used to ensure that the end-user is of the proper age and meets this requirement. Merchant 140 may have discounts for particular end-users that are frequent purchasers, or who received a coupon, promotional offer, etc. The merchant 140 may index a database of end-users to determine whether the end-user qualifies or should otherwise be specially handled based on the provided identity credentials.

Optionally, the merchant 140 may request validation of the identity token by sending a request to the identity provider 120 (step 245). The request for validation of the identity token may include forwarding the identity token from merchant 140 to identity provider 120. Upon receiving the request for validation of the identity token, the identity provider 120 may validate the identity token, and thereby determine whether the identity token is authentic. The identity provider 120 may then forward an indication of the validity of the identity token to the merchant 140 (step 255). Alternatively, the merchant 140 may simply validate the identity token itself (step 265) (e.g., by assuming the identity token is valid or otherwise processing the token). Optionally, a response may be returned from the merchant 140 to the end-user computer 110, where the response may include a message of whether the identity token is valid, of any applicable discount or promotional offers, and/or any other type of message, as the invention is not limited in this respect (step 265).

After the merchant 140 has processed the identity token and/or has received a validation for the identity token from the identity provider 120, the merchant 140 may request that the end-user provide verification or validation of an ability to pay and/or provide an indication of how the end-user would like to pay for the goods or services. The merchant 140 may make the request via a payment token request (step 305 in FIG. 3). In response to the payment token request, the end-user computer 110 may enlist the services of a payment provider 130. Payment provider 130 may be associated with a third party that maintains financial and payment information about various end-users, such as a financial institution, or a third party broker that handles financial transactions and payment procedures.

The end-user computer 110 may solicit a payment token from a payment provider 130 (step 315) by transmitting the identity token to payment provider 130. Alternatively, the end-user may request a payment token by logging onto the payment provider 130 in a manner similar to that discussed in connection with the identity provider 120 (i.e., by providing an identifier such as a SIM subscriber number, NIC address and/or using a login/password combination). It should be appreciated that the end-user may request a payment token in other ways, as the invention is not limited in this respect. In addition, the end-user may send information about the purchase, such as the price and nature of the purchase so that the payment provider can verify that the end-user is capable of paying. However, providing purchase information is not required, as it may not be necessary or it may be handled in subsequent steps of the transaction.

Payment provider 130 processes the identity token (or other provided identifier) to locate information about the end-user. For example, the payment provider 130 may access a database of payment information based on the identity credentials transmitted with the identity token. Payment provider 130 may determine what payment capabilities and options the identified end-user has available. The payment provider 130 may then verify that the end-user has the ability to pay, and in response generate and transmit a payment token to the end-user computer 110 (step 325). The payment token may indicate the end-user's ability to pay and/or a certification that the payment provider 130 is willing to handle the transaction on the end-user's behalf. The end-user computer 110 may then forward the payment token to the merchant 140 (step 335).

The merchant 140 processes the payment token such that the merchant 140 is satisfied that the end-user is able to pay for the goods or services (step 365). For example, the merchant 140 may ask the payment provider 130 to validate the payment token (steps 345, 355) or may simply validate it itself (step 365) (e.g., by assuming the payment token is valid or otherwise processing the token). The merchant 140 may then begin the process of providing the goods and/or services to the end user. Because the payment provider 130 may be a disinterested third party, merchant 140 may treat the payment token essentially as payment and may not have to wait until the transaction is fully processed.

When a merchant deals directly with the end-user in conventional transactional models, the merchant may have to ensure that the payment information provided by the end-user is correct and sufficient. For example, a merchant may have to run a provided credit card number through the credit card system to query whether the number is valid, the card is valid, there are sufficient funds and/or the card is correctly associated with the identity provided by the end-user. If something doesn't check out, the transaction may have to be canceled, terminated or abandoned. Moreover, the termination of the transaction may happen after the end-user perceives the transaction to be complete and is no longer accessing the network and/or is no longer accessing the merchant's website, etc.

The merchant may then have to notify the end-user that there was a problem with transaction and the end-user will have to go through the transaction again to correct the problem (e.g., by correctly inputting payment information, specifying a different card with sufficient funds, etc.). In some instances, the end-user may not be notified and the commercial transaction may never be completed.

In various embodiments discussed herein, because a payment token will not be issued unless the end-user payment information is correct, sufficient funds are available, and/or the payment provider otherwise certifies that it will pay on the end-user's behalf, the merchant can proceed with the transaction immediately. Any deficiencies in the transaction may be identified in real-time and addressed so that all parties can be relatively certain that there expectations are being met with respect to completion of the transaction.

In addition, because the payment provider may handle the financial transaction (e.g., handling the credit card, transferring funds, etc.), the merchant may be relieved of establishing and maintaining the infrastructure necessary to, for example, process credit card numbers or otherwise handle payment procedures and funds transfer. The payment token, in some cases, operates as an assurance that the payment provider will transmit the designated funds, for example, by wiring the money or enacting an electronic transfer of funds to the merchant. The payment token may also be an assurance that the payment will be made by non-electronic means such as a promise to issue to the merchant a check or other negotiable instrument.

From the perspective of the merchant, the commercial transaction is substantially risk free as the identity of the end-user and the payment verification is handled by third parties and is therefore less susceptible to fraud, spoofing and even innocent mistakes in providing personal and financial information. Therefore, merchants may be more willing to conduct online commercial transactions with unknown end-users over an untrusted network. From the perspective of the end-user, personal and financial information resides with entities either that already maintain the information and/or that the end-user has an established relationship with. Confidential personal and financial end-user information need not be provided to the merchant, mitigating the vulnerabilities of having confidential information misused or misappropriated. As a result, end-users may be more willing to conduct commercial transactions with unknown merchants without having to worry about whether the merchant is trustworthy or not.

In some conventional commercial transaction models, identity information and payment information are input by the user and processed by either a third party or the merchant. As discussed above, these models are awkward, inefficient and time consuming for the user. In addition, conventional models present numerous issues regarding security of an end-user's confidential information as well as making a merchant vulnerable to fraud and/or susceptible to failure to pay by an end-user. Applicant has appreciated that commercial transaction software installed on each of the computers employed in various commercial transactions may mitigate or eliminate concerns over security and fraud. In addition, many of the actions handled by the end-user and merchant in conventional models may be performed by the commercial transactions software, making the transaction simpler and more intuitive to the end-user.

Figure 8:
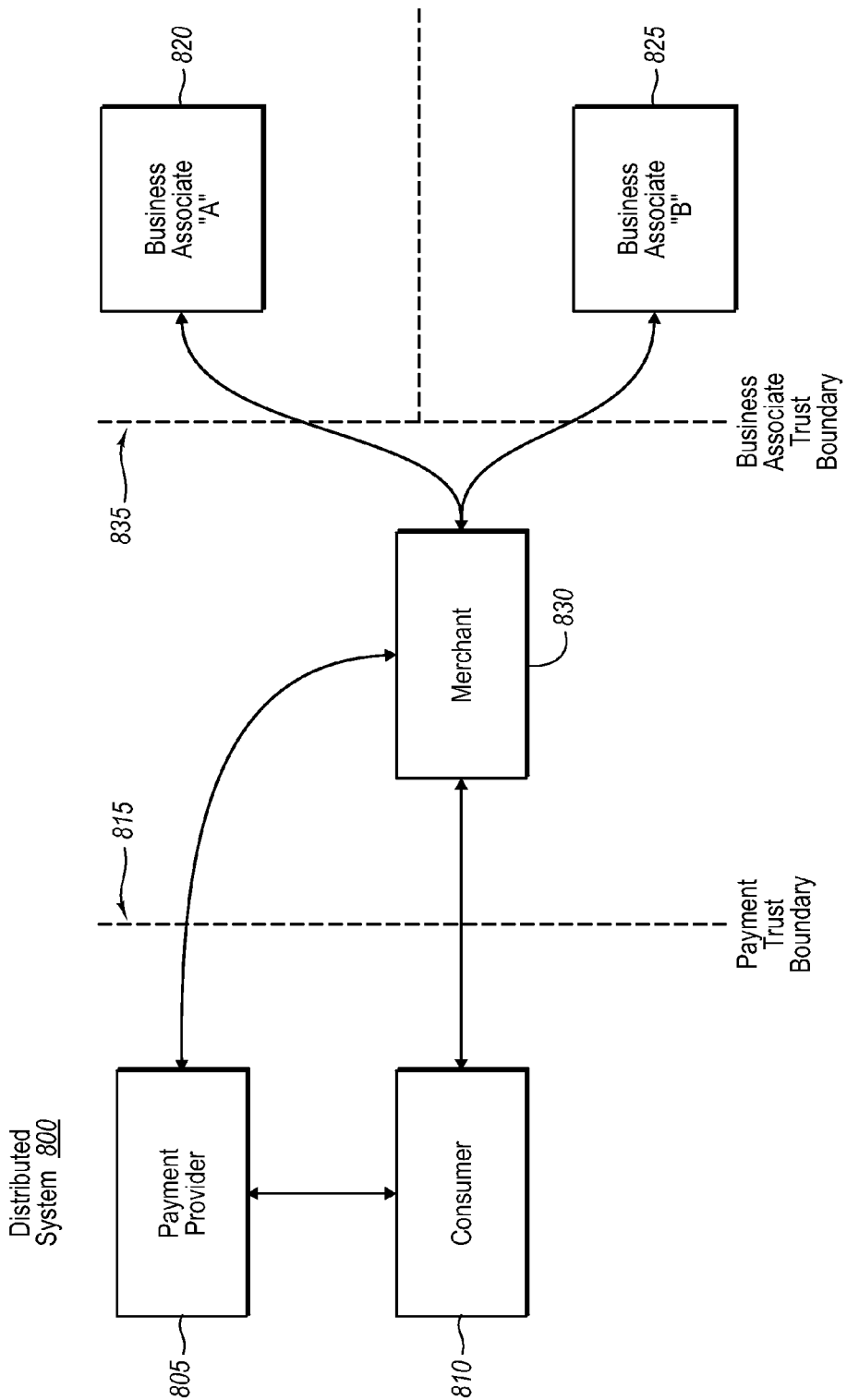
FIG. 8 illustrates a three-way secure exchange of payment information and payment federation in accordance with example embodiments.

FIG. 8 illustrates an example of using some of the features described above for a three-way secure communication and various trust boundaries that may be established during a commercial transaction. As will be described in greater detail below, this model allows for single or subscription payments, as well as payment federation such that a service or merchant can aggregate payment for smaller companies; thus enabling the customer to pay a single bill. As shown, a distributed system 800 is configured to facilitate a commercial transaction between a consumer 810, merchant 830, and a payment provider 805. A payment trust boundary 815 divides the merchant 830 from the consumer 810/payment provider 805 such that a trusted relationship exists between the payment provider 805 and the consumer 810 or customer computing device (i.e., the consumer has appropriately identified or authenticated itself to the payment provider using any of the available mechanisms as described herein). Accordingly, the consumer 810 can utilize this trusted relationship to authorize payment to the merchant 830 for various types of payments and various types of services.

For example, assume that the merchant 830 requires reserve payment for a product (e.g., a custom item that requires prepayment like a car, computer, etc.), which the consumer 810 wishes to purchase. Prior to requesting payment authorization, however, the user of the consumer 810 computing device may require appropriate authentication as described herein. Once the user authenticates, the consumer 810 computing device can appropriately request payment from the payment provider 805 through any various mechanisms as also described herein. For example, the consumer 810 may provide the payment provider with billing or other request information that is signed or otherwise encrypted by the consumer's 810's computing system. This authenticates the request for validation of the account holder's (i.e., the consumer's) ability to appropriately pay (i.e., the user has a prepaid account, credit account, or other billing account such as a mobile subscription as described below). If successful, a payment token is issued and the funds are then reserved for guaranteeing payment. Such payment token is typically then signed and/or otherwise encrypted by the payment provider (e.g., a mobile web server as described herein) and passed to the consumer 810 client. The consumer 810 passes the payment token back to the merchant 830, which verifies the token against the payment provider, and if successful completes the order.

Once the item is ready for delivery (e.g., the custom item has been built), the merchant 830 can use the reserve payment token to request payment from the payment provider 805. Note that the amount of the request for payment may be different than the amount reserved. Nevertheless, the payment provider 805 verifies and returns a payment response to the merchant 830 and/or consumer 810. If approved the merchant 830 can ship (or otherwise provide) the order to the customer 810 and be provided with payment thereof. If, on the other hand, the payment is rejected or further user interaction is required, the merchant 830, payment provider 805, and/or consumer 810 can choose what course of action to take. For example, if the amount requested by the merchant 830 does not match the funds reserved, the payment provider 805 and/or merchant 830 may request authorization from the consumer 810 for the new amount. Alternatively, the payment provider 805 may require user input authorizing the transfer of funds regardless of any change in reserved and requested payment amounts. Of course, other actions and procedure for completing the commercial transaction are also contemplated herein.

Note that although the above three-way secure payment mechanism was used to purchase a reserve item, the single payment may also apply to other services and/or goods. For example, the single payment mechanism may apply to a software program that is ready for immediate download. Alternatively, or in conjunction, the single payment may unlock various levels of a program that was downloaded (e.g., student version, professional version, or other separate functionality). In fact, as will be appreciated the above single payment can be used for a variety of different types of purchases, some in a slightly modified payment form.

For example, suppose the consumer 810 wants to setup a subscription with a merchant 830 for continual service (e.g., a newspaper or magazine subscription, movie subscription, gaming application, or other pay-as-you go goods and/or services). Accordingly, the merchant 830 will challenge the consumer 810 for a payment token, and thus the consumer 810 client may interact with the user requesting authorization to proceed as described herein. Similar to above, the consumer 810 signs or otherwise encrypts the request for payment (e.g., using electronic billing information as described herein below) and send such request to the payment provider 805 (e.g., a mobile operator, credit card company, pre-paid or other type of third party service, etc.). This authenticates the request and verifies the account holder (i.e., the consumer or customer) has sufficient initial funds. If successful, a payment token is issued, signed and/or otherwise encrypted, and returned to the consumer 810 client, which passes the payment token back to the subscription merchant 830. The merchant 830 then verifies the authentication of the token and completes the subscription setup.

Note that typically the payment token is stored at the merchant 830 and periodically used when requesting subscription payment from the payment provider 805. Accordingly when processing subscription payment, the merchant 830 retrieves the payment token and sends it to the payment provider 805 for payment settlement. The payment provider 805 verifies and returns a payment response to the merchant 830 and/or consumer 810. If an approved response is returned, the subscription merchant 830 will receive payment during the next payment provider 805 account payment run. If the payment request is rejected, however, the payment provider 805 and/or merchant 830 may respond appropriately. For example, the merchant 830 (or payment provider 805) may contact (e.g., via email) the user or consumer 810 informing them of the outstanding payment. The consumer 810 can then perform a single payment as described above or setup another subscription payment through either the same of different payment provider 805. Of course, the merchant 830, payment provider 805, and/or consumer 810 may have other rules or requirements for processing these and other payment authorizations, as will be described in greater detail below.

As previously mentioned, other embodiments allow for federation of a single consumer 810 payment to a plurality of business associates or subsidiaries with a contractual arrangement. Often business relationships are complex and require distribution of payments for various services and/or goods provided within a particular business model. For instance, when purchasing a trip from a travel agent 830, a consumer 810 may be provided with a package deal including flight arrangements, hotel accommodations, transport services, etc. The merchant 830, who typically contracts out many of such services and/or goods, must then keep detailed accounting of such commercial transaction in order to make appropriate payments to its business associates. In order to alleviate the complexity of such accounting and other tasks, embodiments herein provide for an automatic payment federation to business associates within a particular type of relationship on a per transaction basis.

For example, a car rental service (e.g., business associate "A" 820) may require payment from merchant 830 as part of a holiday package sale. An insurance company (e.g., business associate "B" 825) may charge the merchant 830 on a per transactional fee basis. Based upon the business associate trust boundary 835, payments are automatically federated to each business associate (e.g., "A" 820 and "B" 825) when a single payment is made to the merchant 830. In other words, the consumer 810 or payment provide 805 makes a single payment to the merchant 830; however, all subsidiaries with a business relationship according to the trust boundary for the business model 835 can be appropriately paid. Note that such payment will typically be tied to the electronic billing statement as described in greater detail below. More specifically, various portion of an electronic bill for capture, presentation, and other purposes can correspond to what portion of payment should be federated to each business associate. Further, each of these portions may be signed and/or encrypted such that particular information about the payment is opaque to the consumer 810, payment provider 805, or amongst the various business associates 820, 825 as defined by the various trust boundaries 815, 825.

Note that although the above payment federation model was described with regards to a travel agent experience, other business relationships also exist that can use this embodiment. For example, companies who build items with multiple components purchased through various vendors, product providers who buy materials for there product and make payments based on a per item bases, payments for multimedia products who pay royalties based on each sale, or any other type of business model that bundles or otherwise can calculate and make payments to business associates on a per item basis may also use embodiments described herein. As such, the above use of the travel agent for describing various embodiments herein is for illustrative purposes only and is not meant to limit or otherwise narrow embodiments described herein.

Figure 4:
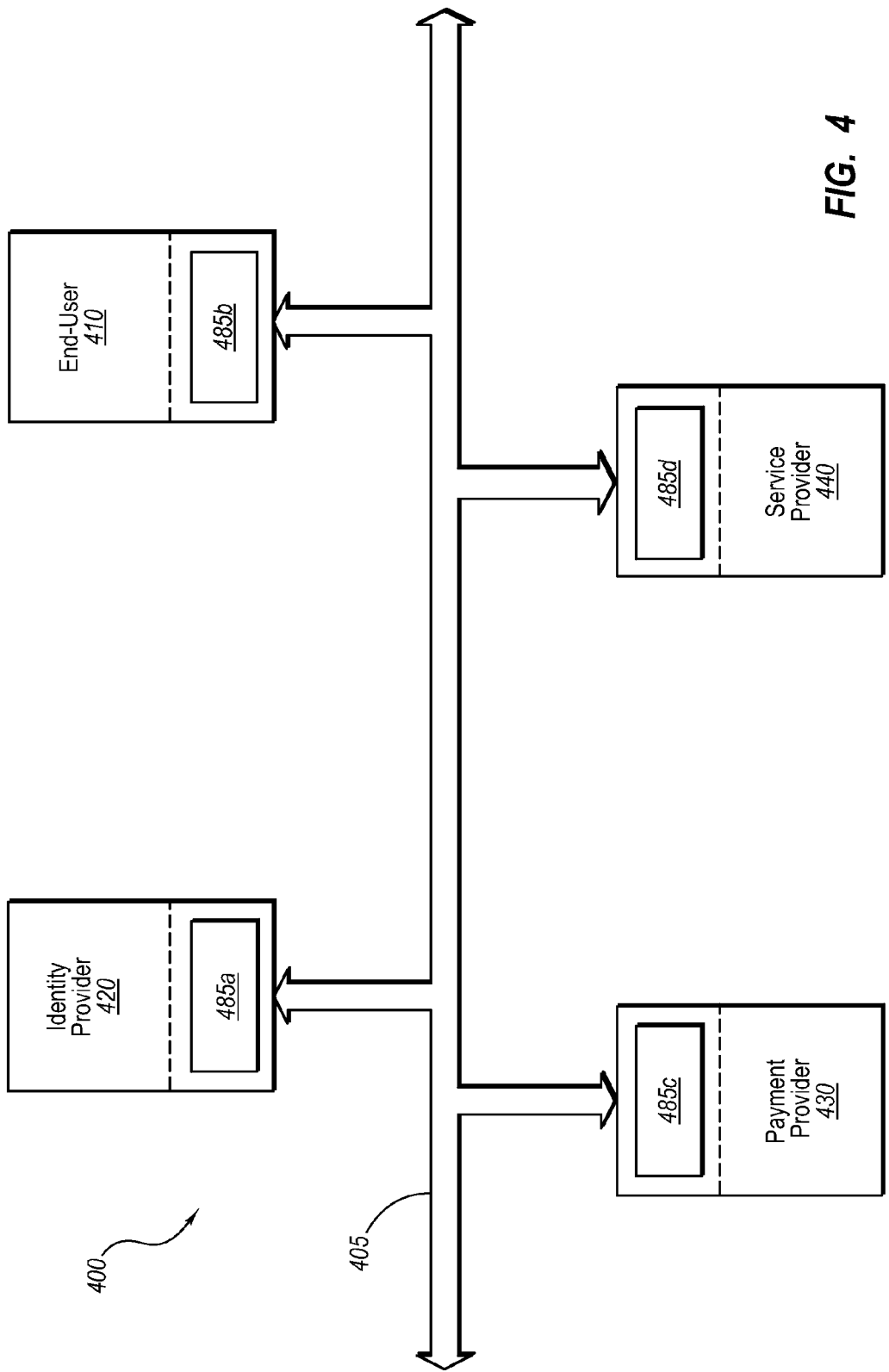
FIG. 4 illustrates a networked computer system for conducting online transactions, wherein transactions are handled, at least in part, by transaction software installed on computers connected to the network, in accordance with one embodiment of the present invention.

FIG. 4 illustrates a networked computer system for handling commercial transactions, in accordance with one embodiment of the present invention. Networked computer system 400 may be similar to computer system 100 illustrated in FIG. 1. However, in FIG. 4, each of computers in system 400 includes local installations of commercial transactions software 485. In particular, end-user or consumer computer 410, identity provider 420, payment provider 430 and merchant 440 include commercial transactions software 485a-485d, respectively. The commercial transactions software locally installed at each of the computers in the system may be the same, or may be customized for the particular computer in view of which role(s) the computer plays in the transaction (i.e., whether the computer operates as an end-user node, a merchant node, identity provider node, payment provider node, etc., or some combination of the above). In either case, each installation is configured to communicate with installations on other networked computers to perform online transactions. For example, each installation may be configured to communicate with installations on networked computers so as to perform the methods illustrated in FIG. 2 and/or FIG. 3.

In one embodiment, the local installation of the commercial transaction software 485a on identity provider 420 can create an identity token identifying the end-user utilizing end-user computer 410. Furthermore, the commercial transaction software 485a on identity provider 420 can forward the identity token to the end-user computer 410, the payment provider 430, the merchant 440, and/or any other computer, as the invention is not limited in this respect. The local installation of the commercial transaction software 485b on the end-user computer 410 can issue identity information (so as to identify the end-user) in response to an indication to conduct an online transaction between the end-user and a merchant. The local installation of the commercial transaction software 485c installed on payment provider 430 can receive the identity token and generate a payment token verifying an ability of the end-user to pay (e.g., the payment token) for the online transaction. The local installation of the commercial transaction software 485d installed on the merchant 440 can receive the verification of the ability of the end-user to pay before proceeding with the online transaction.

In one embodiment, each of the computers in system 400 operates using a local installation of a same or similar operating system 495. For example, each of the computers in system 400 may operate using the Microsoft Windows® operating system. Commercial transactions software 485 may be a subsystem of the operating system. In this way, the various computers employed in a commercial transaction communicate in a consistent and known fashion. Since the commercial transactions software is communicating directly over the network and handling the validation, verification and security, the end-user and merchant need not know anything about one another, and more importantly, may not need to establish any trust relationship. In addition, because certain portions of the transactions are handled by the operating system, much of the transaction may be performed substantially invisible to the user, without requiring confusing and oftentimes awkward involvement by the end-user.

By having the commercial transactions software on each computer, various encryption techniques may be used during transmission of information from one computer to another. Moreover, further security features may be included such as identity tokens and/or payment tokens that are valid for a limited time period. For example, an identity token may include a time component that specifies a time after which any component receiving and processing the token should deem it invalid, and not honor the token as verification of identity and/or payment. The commercial transactions software components may programmatically process any time limits associated with a token. This may prevent tokens obtained by "fishing" from being used inappropriately at a later date.

It should be appreciated that the commercial transaction software need not be part of the operating system, but may be any program or group of programs local to computers involved in a commercial transaction that can communicate with one another over the network. For example, the commercial transaction software may be an application developed by a third party that can be installed on the computers to operate on or independent of the operating system installed on the computer. The application may be configured to operate with any one or combination of operating systems so as to be available to computers or devices of a wide range of capabilities and configurations, and not limited to any particular operating system, processor, instruction set, etc.

Figure 5:
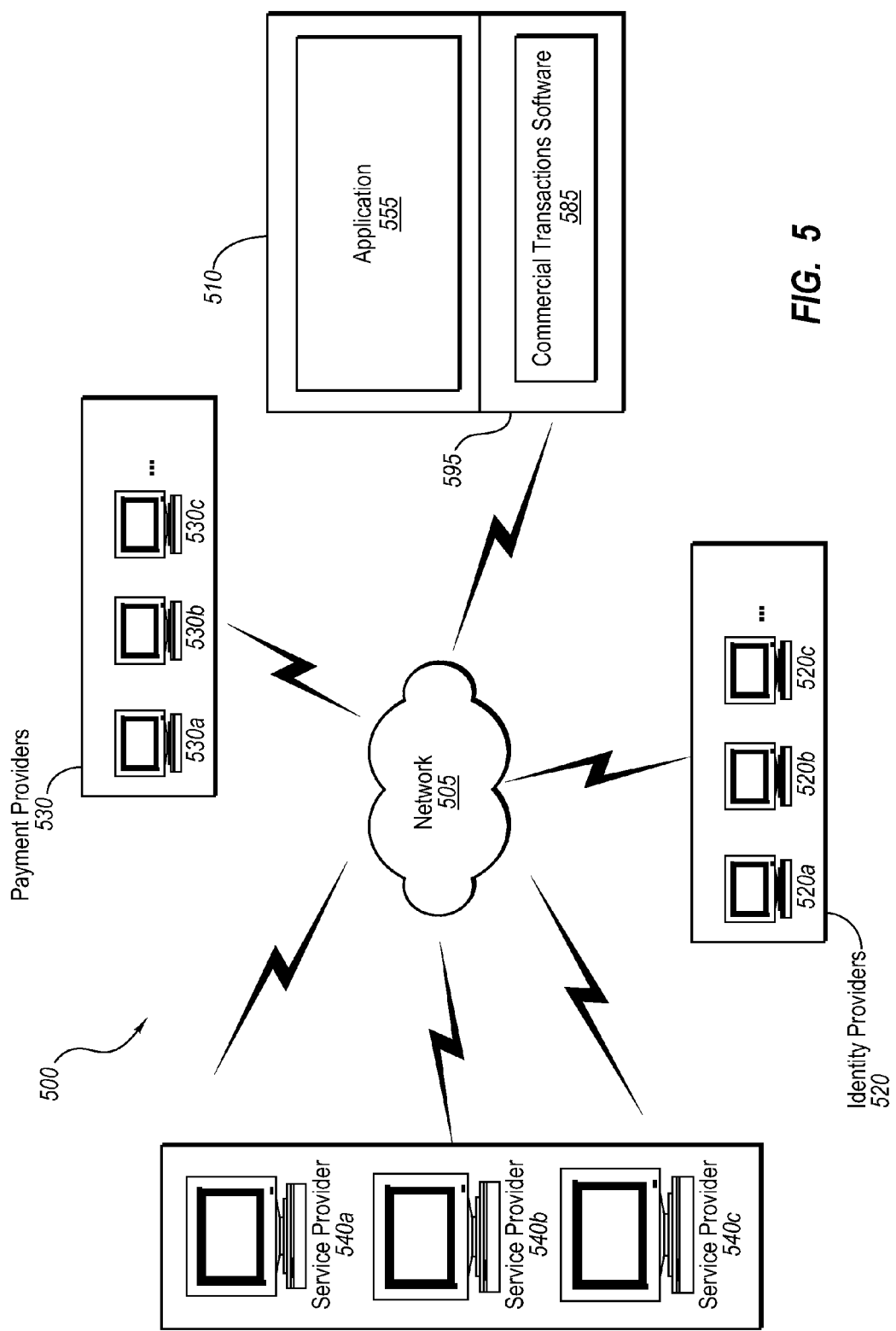
FIG. 5 illustrates a networked computer system for conducting online transactions, wherein transactions are handled, at least in part, by transaction software installed on computers connected to the network, in accordance with another embodiment of the present invention.

FIG. 5 illustrates a commercial transaction initiated by an end-user selecting one or more desired goods and/or services, wherein the transactional components of the purchase are handled, at least in part, by a transaction software subsystem distributed as part of the operating system of the various computers involved in one or more transactions. An end-user connected to network 505 through end-user computer 510 may be running an application 555. Application 555 may be a browser displaying the website of a business that offers merchandise or services for sale. Application 555 may be an application that provides an option to engage in an online transaction, such as an imaging editing program that allows users to manipulate images.

The end-user may select one or more goods or services to purchase via application 555. For example, the end-user may wish to have an edited image professionally printed on photo quality paper. Application 555 may include such an option under the print menu. The print option, when selected, may generate a window or dialog box listing all of the available printing options, including services available over the network. For example, the print option may list service providers 540a, 540b and 540c as options for providing the printing service. When the user selects one of the service providers, an online commercial transaction as described above may be initiated. In particular, the service provider may request that the end-user provide an identity token. In response, application 555 (or an application embedded in commercial transactions software 585), may generate a dialog box or interface listing available identity providers. For example, as described in greater detail below, the dialog box may list identity providers 520a, 520b and 520c as possible identity providers that the user may select to handle identification verification.

Figure 9:
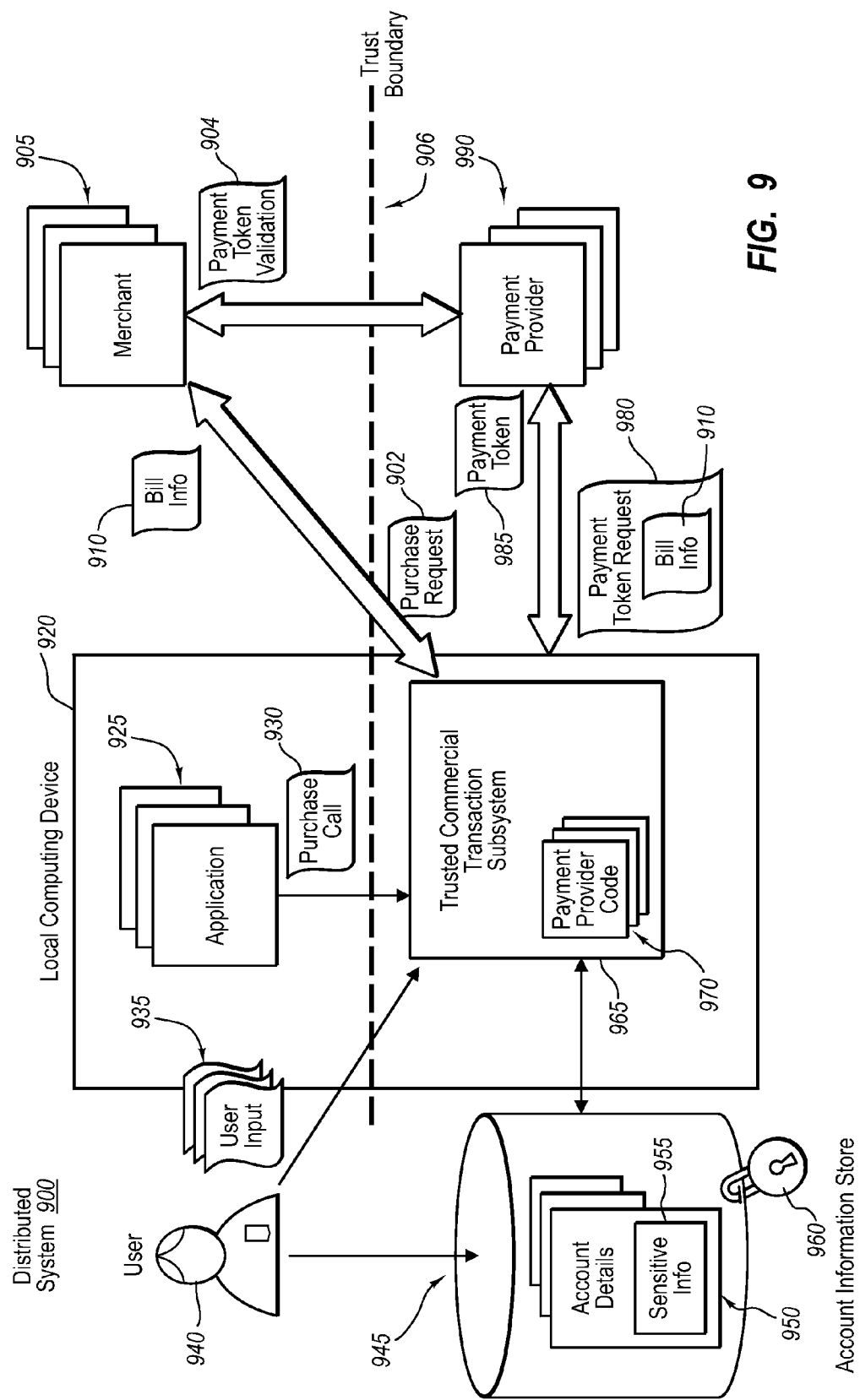
FIG. 9 illustrates various uses of a commercial transaction subsystem and bill presentation in accordance with example embodiments.

FIG. 9 illustrates the use of a trusted commercial subsystem and other features in a distribute system and in accordance with example embodiments. As shown, a local computing device 920 within distributed system 900 is configured to provide an online or local retail transaction in accordance with embodiments described herein. Note that although the trusted commercial transaction subsystem 965 is shown only as part of the local computing device 920, similar subsystems may also reside on other network entities. Further note that although various components or modules may be described herein as residing on any particular network entity, such components or modules may be distributed throughout the computing system and reside on any number of network entities (i.e., portions may exist on one or more network entities). Accordingly, the specific aesthetic layout and use of a particular module by a network device or entity is used herein for illustrative purposes only and is not meant to limit or otherwise narrow the scope of embodiments herein.

Regardless of the distribution and aesthetic layout of the computing system 900, as previously described there exists a trust boundary 906 separating the trust relationship between the various components. Although the relationship may be divided up differently, in the present example the trusted relationship exists between the payment provider 990 and the trusted commercial transaction subsystem 965. This advantageously allows for many features that current commercial systems cannot provide. For example, the trust boundary 906 abstracts applications 925 from the commercial transaction with the merchant. Accordingly, legacy and other applications 925 can provide an in-band experience to the end user 940, although much of the functionality appears out-of-band. For instance, in the above example of allowing a professional image printing on photo quality paper, the selection within the pull down menu, the identity validation, payment options, and other components for assisting the user in such service purchase appears as part of the application 925. Accordingly, the application 925 when receiving input to purchase services and/or goods can make a purchase call 930 into the trusted commercial transaction subsystem 965, which is then used to generate dialog boxes, receive user 940 input 935, and otherwise automatically communicate with the merchant 905 and/or payment provider 990 as described herein.

In other words, the user 940 does not need to necessarily trust the application 925 or the merchant 905 in the commercial transaction. In stead, the trust is limited to the subsystem 965 of the present framework, which reduces the degree or levels of trust needed to confidently and securely perform a commercial transaction. That is, the account details 950 for the user 940, which include sensitive information 955 that the user 950 is unwilling or uncomfortable to publicly share (e.g., credit card information, personal information, user names/passwords, etc.), are accessed via either direct user input 935 to the subsystem 965 or from secure 960 account information store 945. As such, applications 925, merchant 905, and other components are abstracted away from financial and other billing account details 955 controlled by the subsystem 965 as described herein. This is very different from current commercial transaction models described above where applications 925 or merchants 905 maintain and control account information. Accordingly, this and other embodiments described herein advantageously provide for additional layers of security during such commercial transactions. This is a much more directed trust relationship in order to minimize the number of components or organizations that have access to or touch the very sensitive financial data.

Also shown in FIG. 9, and similar to the three-way secure commercial transaction described above, the trust boundary 906 also indicates a secure communication between the payment provider and the trusted commercial transaction subsystem 965. Accordingly, the subsystem 965 authenticates to the payment provider(s) 990 in any one of numerous ways described herein, allowing for secure communication therewith. Similar to above, local computing device (which can be a handheld portable device as described below in a local retail transaction, a personal computer in an online transaction, or other similar device as described herein) desires various services and/or goods offered by merchant(s) 905. In this example, billing information 910 is presented to the local computing device 920 for authentication, auditing, and other purposes as used in example embodiments described herein. Such billing information may include, but is not limited to, cost of the merchandise and/or services, detailed description of the commercial transaction, merchant 905 specific information, federation payment information, type of transaction (e.g., single payment, subscription, etc.), or other types of billing information. The bill information 910 may also include other information such as merchant constraints and payment options as described in greater detail below.

In one embodiment, the bill information 910 is an electronic bill configured to be machine readable, which provides for many advantageous abilities of the current commercial transaction system. For example, one embodiment provides that the billing information 910 can be part of the payment token request 980 (or otherwise delivered in another communication to the payment provider 990) as previously described. As such, the bill information may be used by the payment provider 990 for payment token validation 940. More specifically, the bill information 910 provided from the consumer or local computing device 920 can be compared with the payment token 985 information provided from the merchant 905 in the payment token validation 904. Accordingly, if the bill information 910 for the payment token validation 904 matches the bill information 910 from the token request 980, the payment provider 990 can be further assured of the authenticity of the payment token 985 and the validity of the merchant.

Note that how the bill information 910 from the merchant is relayed to the payment provider 990 (as well as other components herein) may vary. For example, the bill information 910 sent from the merchant 905 to the payment provider 990 may be a copy of the bill information 910 sent to the trusted commercial transaction subsystem 965 or client 920. Alternatively, or in conjunction, the bill information 910 may be a signed and/or encrypted version from the payment provider 990, routed via the consumer or local computing device 920. In either case, the payment provider can do the comparison previously described for authentication of the payment token 985.

Further note that such billing information 910 as used by the payment provider 990 can also be used to give a more detailed description of charges associated with a bill that will subsequently be presented to the user 940 for charges on the user's account. Because this can also be a machine readable bill 910, the local computing device 920 can match up the bill information 910 with that previously received by the merchant 905 for further authorization of payment to the merchant 905. In other words, if the bill information 910 within the bill from the payment provider 990 does not match any received from the merchant 905, then the charges may be considered fraudulent.

In another embodiment, the merchant 905 can use the bill information 910 for auditing, user and other authentication purposes, payment federation, etc. For example, the merchant can sign or otherwise encrypted portions of the bill information 910. This allows for multiple advantageous features in embodiments described herein. For example, the bill information 910 may be part of the payment token 985 received by the payment provider via the local computing device 920. The merchant 905 can check the validity of the billing information 910 for authenticating that the payment token 985 came from the client 920 or trusted commercial transaction subsystem 965. Similarly, the during the payment token validation 904, the merchant 905 can use billing information 910 received from the payment provider 990 to validate or authenticate the payment provider 990 and/or local computing device 920. In other words, because the bill information 910 is routed to the payment provider via the subsystem 965 or consumer 920, billing information received from the payment provider that matches that sent to the client 920 can authenticate both the client 920 and payment token 985 from the payment provider 990.

Note that in another embodiment, as briefly described above, the bill information 910 can also be used by the merchant for payment federation. In this embodiment, various portions of the bill information 910 may be machine readable for determining what portions of funds from the payment provider 990 (upon successful payment authentication) should be distributed to business associates as previously described. Note that in this embodiment, typically portions of the bill information 910 will be encrypted or otherwise opaque to the user 940 (or consumer client 920), payment provider 990, or other components not part of a business relationship with the merchant 905. This also uniquely identifies the business associate in the billing federation, and can be used thereby for authentication purposes. More specifically, the various portions of the bill information 910 specific to a business associate can be encrypted using a key specific such business associate, thus the billing information may only be seen by the merchant 905 and the specific business associate. In other embodiments, however, the portions of the bill for payment distribution or federation are only signed by the merchant 905 to make then opaque to other components in the system 900.

Of course, as will be recognized, other uses of the billing information 910 can be used for various purposes. For example, the billing information 910 can also be used for auditing purposes, product distribution reconciliation, or any other well known business and other purposes. Accordingly, the above use of the bill information 910 for authorization, identification, payment federation, or any other purpose is used for illustrative purposes only and is not meant to limit or otherwise narrow the scope of embodiments unless otherwise explicitly claimed.

Note that the trust boundary 906 and the subsystem 965 also have other advantageous features in other embodiments described herein. For example, as shown in FIG. 9, payment provider code 970 within the subsystem 965 allows for securely running code specific to one or more payment providers 990. Such code can be used for further authorization specific to the payment provider, e.g., biometric, radio frequency identification (RFID), user name/password, or any numerous additional authentication techniques. In other words, due to the trusted relationship that the payment provider 990 has with the subsystem 965, the payment provider can run trusted code for its specific business purpose.

The use of such code 970 also allows for a more integrated in-band user experience that can be controlled by the payment provider 990 or any other component that has a trusted relationship with the subsystem 970. For example, although not shown, a trusted relationship may exist between some merchants 905 and the subsystem 965 for allowing trusted code thereof to be run by the subsystem 965. As such, the merchant 905, payment provider 990, or any other component involved in the commercial transaction, may provide an integrated user experience that appears as if ran from within the application 925 (legacy or otherwise); however, many of the events occur out-of-band. For instance, in the above example of a photo quality print of an image by a professional service, the dialog boxes, payment options, or any other number of features presented to the user or application functionality (e.g., in response to user input) may be controlled by the code 970 specifically provided by the various trusted network entities (e.g., the payment provider 990, the merchant 905, etc.). Accordingly, as will be described in greater detail below, this code can also be used when evaluating payment options and other constraints from the merchant 905 and/or payment provider 990.

As mentioned above, in one embodiment, the selected service provider or merchant transmits any requirements to the identity provider with the request for identity verification. For example, service provider may be selling goods or services that require a minimum age or is restricted to a certain geographical location. Accordingly, the listing of identity providers may be limited to those that can provide identity credentials that satisfy the requirements of the service provider. For example, the list of identity providers may be restricted to those that can provide age verification or current address information, such as the RMV.

Likewise, a dialog box may be generated listing options for payment providers. For example, the dialog box may list payment providers 530*a*, 530*b* and 530*c*, which may include a credit card company, a bank offering electronic debit services, or a private third party offering financial services, respectively. As with the identity request, the selected service provider may include any payment requirements associated with the purchase. For example, the service provider may only accept a certain type of credit card. The payment requirements may then be reflected in the available payment providers listed or enabled in the payment provider selection dialog box. After a payment provider is selected, payment certification may proceed and the transaction may be completed.

Figure 10:
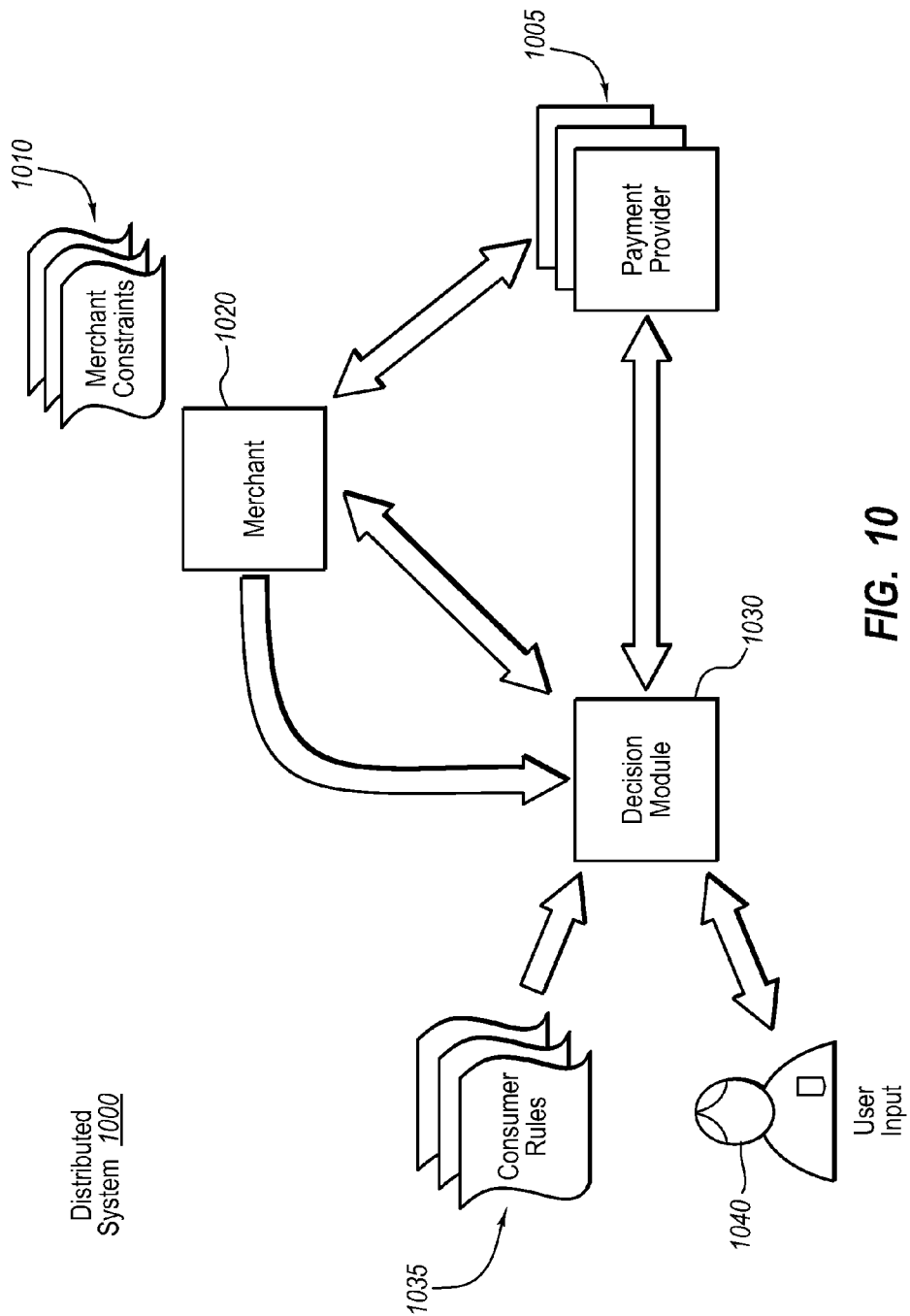
FIG. 10 illustrates the use of payment options and rules for determining what type of payment provider should be used for a commercial transaction in accordance with example embodiments.

Note that other embodiments also provide for comparison of merchant constraints (e.g., available payment options, age restrictions, etc.) with consumer rules for determining various actions that may be taken. FIG. 10 illustrates such an embodiment, wherein a distributed system 1000 is configured to programmatically determine actions based on such things as merchant constraints 1010 and/or consumer rules 1035. For instance, merchant 1020 can define within the merchant constraints payment providers 1005 or types of payment acceptable for purchasing services and/or goods thereof. Decision module may then present such constraints to the user, e.g., in a user interface requesting user input 1040 for choosing one or more of the available payment options. Based on the user input 1040, the appropriate payment provider 1005 may be contacted for proper funding of the services and/or goods.

In another embodiment, consumer rules 1035 can also be used in addition to, or in place of, the merchant constraints 1010. For example, consumer rules 1035 may indicate that only certain types of payments can be made for certain types of merchants 1020. More specifically, the consumer rules 1035 may indicate that if a merchant 1020 is not registered or otherwise trusted, that only payments that can be reversed may be used for purchased made from the merchant 1020.

Of course, as described above, other merchant rules 1010 and consumer constraints 1035 can be used by decision module 1030 when determining actions to take in a commercial transaction. In fact, the merchant constraints 1010 and consumer rules 1035 may be compared for compatibility and other purposes. For example, the available payment options from the merchant 1020 can be compared to payment providers 1005 available or allowable by the consumer when presenting the user with a selection of payment providers 1005. Of course, the payment selection may also occur automatically based on such things as a default setting, provider ratings or preferences, or any other number of option settings. If fact, any number of actions may occur based on the implementation of the various merchant 1010 and/or consumer 1035 rules. For example, if the rules (merchant 1010 or consumer 1035) fail or are otherwise violated, additional input from the merchant 1020 or user 1040 (either automatically based on additional rules or settings) may be needed to resolve conflicts or other discrepancies. Accordingly, any particular action taken when implement the constraints and/or rules defined are used herein for illustrative purposes only and are not meant to limit or otherwise narrow embodiments provided herein.

Further note that, as described above, the merchant constraints 1010 may be included within the billing information or provided separately to the consumer. Also note that the comparison of various rules and actions taken thereby may all occur under the covers, i.e., without the knowledge of the user and/or other system components. In addition, note that the present system is not limited to just constraints or rules defined by either the consumer or the merchant. For example, the payment provider may also define various restrictions that can also be considered in conjunction or instead of the consumer and/or merchant rules. Accordingly, the above use of merchant and consumer constraints for determining various actions (such as payment provider options) is used herein for illustrative purposes only and is not meant to limit or otherwise narrow embodiments herein described unless otherwise explicitly claimed.

In conventional online transactions, it may be difficult for both the end-user and/or the service provider to know for certain when a transaction is complete and whether the goods or services have been successfully delivered. For example, an end-user may select a software package for download over the network, or an end-user may purchase songs, movies or other electronic media. Sometimes a network connection may be disrupted before the download can be completed. Under such circumstances, the end-user may be tempted to select the merchandise again, but may be hesitant because the end-user does not know whether he or she will be double charged for the purchase. Likewise, the service provider may not know if a download was completed successfully and may double charge when a user attempts to remedy the disruption by selecting the merchandise again.

Applicant has appreciated that providing logging or auditing capabilities in the commercial transactions software may eliminate some of the uncertainties with respect to electronic downloads. For example, final execution of the payment option may depend on a signal from the auditing feature that the download is complete. That way, if a download is interrupted, the end-user can be certain that the selected payment option did not go through. For example, commercial transactions software 585 from FIG. 5 (or other subsystems or network entity components as described herein) may include a logging feature that records all of the various steps of the commercial transactions conducted by the machine. The logging information may be used as proof of purchase or to otherwise memorialize transactions. In addition, commercial transactions software 585 may include monitoring capabilities for electronic downloads, which sends a verification of a successful download, only after which final payment will be made. By making payment contingent on a signal that the transfer of goods or services was completed successfully, issues of double billing may be addressed and substantially eliminated.

Software has been developed by companies to handle a wide variety of tasks including familiar word and document processing, spreadsheets, imaging editing, to more specialized tasks such as video editing, computer graphics software, web-content development applications, portfolio management software, etc. However, to own software that handles each task that an end-user may want to perform may be prohibitively expensive. Software packages can cost anywhere from hundreds to thousands to tens and even hundreds of thousands of dollars to obtain a single license. Moreover, an end-user may need the services of a particular application only occasionally or sporadically, such that the cost of purchasing the application may not be justified.

Figure 6:
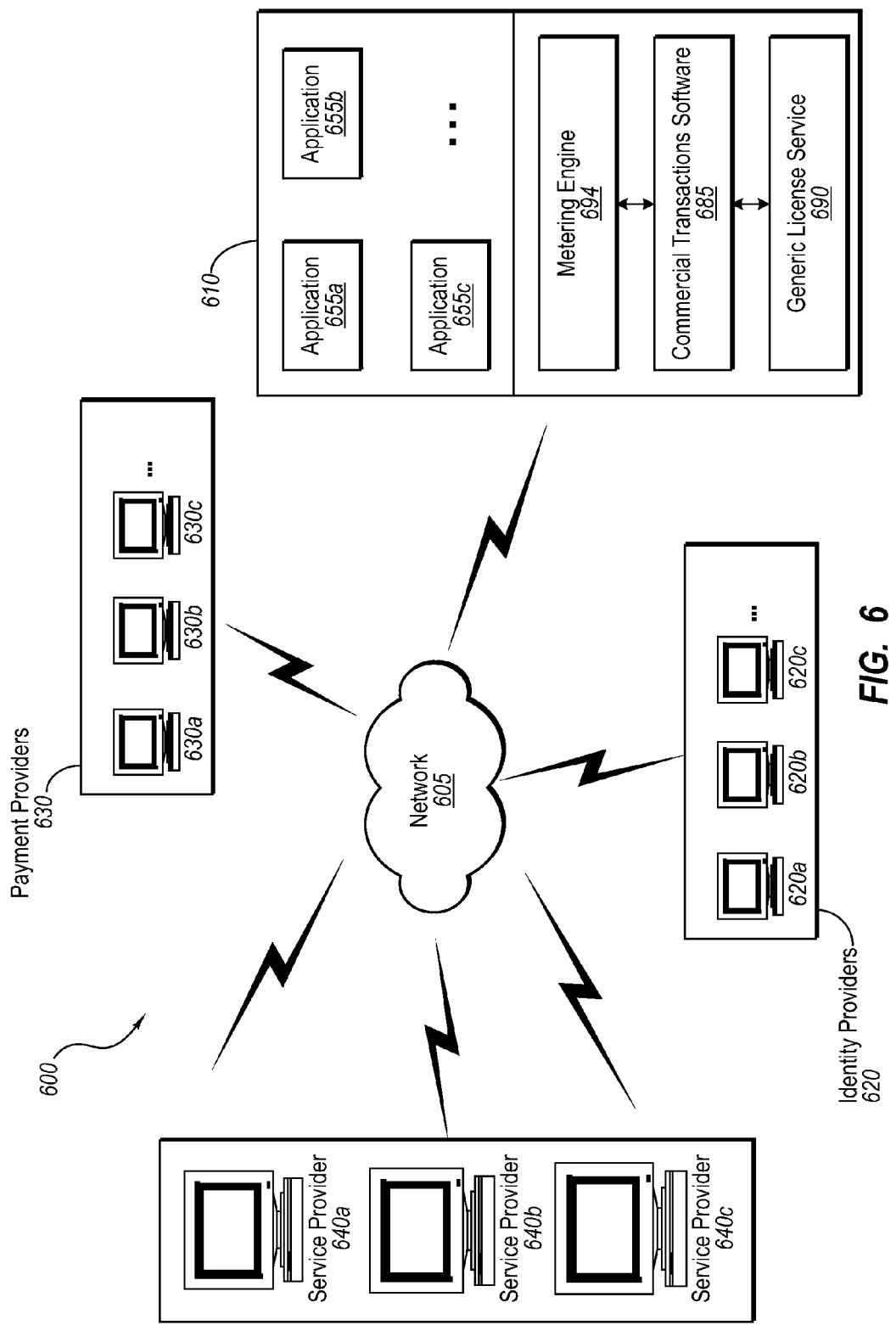
FIG. 6 illustrates a networked computer system for conducting licensing for applications installed on an end-user computer, wherein the license is obtained via an online transaction, in accordance with one embodiment of the present invention.

Applicant has appreciated the benefits of enabling an end-user to utilize software in a pay-as-you-go environment. In particular, an end-user may be charged only for the amount of time spent using the application, rather than paying the retail price for the software (where many of the features and/or the application would go largely unused). FIG. 6 illustrates a networked computer system having a commercial transaction framework that allows an end-user to pay for the amount of time spent using the application. Networked computer system 600 includes a network 605 interconnecting end-user node 610 to a plurality of identity providers 620, a plurality of payment providers 630, and plurality of service providers 640.

End-user node 610 may be a computer running on an operating system 695. Installed on the end-user computer may be a plurality of software applications 655. The software applications may have come bundled with the computer at purchase, may have been downloaded freely over a network, or otherwise distributed (often for free or for a nominal charge, or for registering with the vendor) by the seller of the application. Application 655 may be any type of application and any number of applications may be installed on the computer. Service providers 640 may be associated with one or more applications installed on end-user computer 610. For example, service provider 640*a* may be one or more computers owned by the developer and seller of application 655*a*. Similarly, service providers 640*b* and 640*c* may be associated with applications 655*b* and 655*c*, respectively.

In the pay-as-you-go model, the service provided by the service providers is a license to use the associated applications installed on the computer. For example, when software (e.g., applications 655) is freely distributed, it may be initially disabled so that users cannot run the application without first obtaining a license from the seller of the application. The license may be obtained by initiating a commercial transaction with one or more of the service providers 640. For example, application 655*a* may be a desktop publishing application that an end-user would like to use for a couple hours to design a card or brochure. When the end-user opens application 655*a*, the end-user is notified that the end-user needs to purchase a license to use the application. For example, a dialogue box may appear listing the characteristics and prices of the various for-use licensing capabilities.

A license may be for a specified amount of time, for example, an hour or a day. The license may expire once the application has been closed down, or the license could remain active until the term has expired. The license could be based on operations or tasks that allow an end-user to complete one or more jobs or employ one or more desired features. Additional features to be used may increase the cost of the license. It should be appreciated that a license having any desired terms may be negotiated, as the aspects of the invention are not limited in this respect.

Once the end-user has selected a license option, the end-user may be instructed to select an identity provider and/or payment provider, or one or the other may be selected by default to initiate an online transaction. The transaction may be handled by commercial transaction software 685 substantially as described in any of the foregoing or following embodiments. When service provider receives a payment token from one of the payment providers 620, the service provider may transmit a license according to the terms agreed upon at the initiation of the transaction.

The received license may be processed by generic license service 690 so that the appropriate accessibility to the application may be invoked. The generic license service may then issue an enable key to application 655 so that the user may run the software and utilize its functionality according to the license. The enable key may include any information the application may need to provide the necessary services for the term indicated in the license. The enable key may include a password provided by the service provider such that the application knows that the license is valid and/or may simply rely on the representation from generic license service 690 that a valid license has been obtained. Once the application is operating, metering engine 694 may be notified to keep track of time and to indicate to the application when the license has expired. Alternatively, the application may be programmed to periodically query the metering engine and then disable itself when the license has expired. Moreover, by querying the metering engine, the application may give periodic warnings or updates to the user about the amount of time remaining in the purchased license, should the license include a term.

When the end-user is finished he may choose to have the completed product professionally printed and select a print option that initiates another online transaction such as the transaction described in connection with FIG. 5. The pay-as-you-go license may provide users with much more flexibility and give them access to software that they would not have had prior access to due to the cost of buying the software package with a lifetime license. In addition, software vendors can capitalize on revenue from user's who were unwilling to pay full retail price, but willing to pay for limited use and/or limited functionality.

Software piracy impacts profits across the entire software industry. User's of unlicensed software cost businesses relatively substantial amounts each year. Once a software product has been purchased, the seller has little control over where and to how many computers the software is installed. Illegally providing software for download over the Internet provides an even more pervasive method to distribute and obtain software that the end-user has not paid for. Applicant has appreciated that providing a relatively secure and simple commercial transactions framework with a pay as you go license scheme, for example, the framework described in the embodiment illustrated in FIG. 6, may mitigate or eliminate the piracy problems. Since the software is distributed freely by the seller, end-users can appropriate the software anyhow they see fit. Since the software is enabled only through paying for a term license or task license, end-users are substantially limited in their ability to misuse the software.

As previously described, embodiments herein allow for authentication for identity and/or payment purposes using a mobile module (e.g., a subscriber identity module (SIM)) tied to a particular billing account of a mobile infrastructure or operating system. Unlike typical standards for mobile communications (e.g., Global Systems for Mobile communications (GSM), 3rd Generation Partnership Project, and other similar protocols), which occurs via a trusted radio network, authentication in accordance with embodiments herein takes place over an independent untrusted data network (e.g., the Internet). As a result, embodiments herein address many of the additional security concerns imposed by the use of such mobile modules (SIMs) in a Web Services and other independent network protocol environments. Such security concerns include among other things: determining a trusted network endpoint for the authentication of a server; authentication of a client to a mobile module or SIM device; authentication of a user to the SIM device; authentication of the SIM and authentication server; establishment of a secure network connection between the mobile module and network authentication server; and authentication of the user to the network authentication server.

Figure 11:
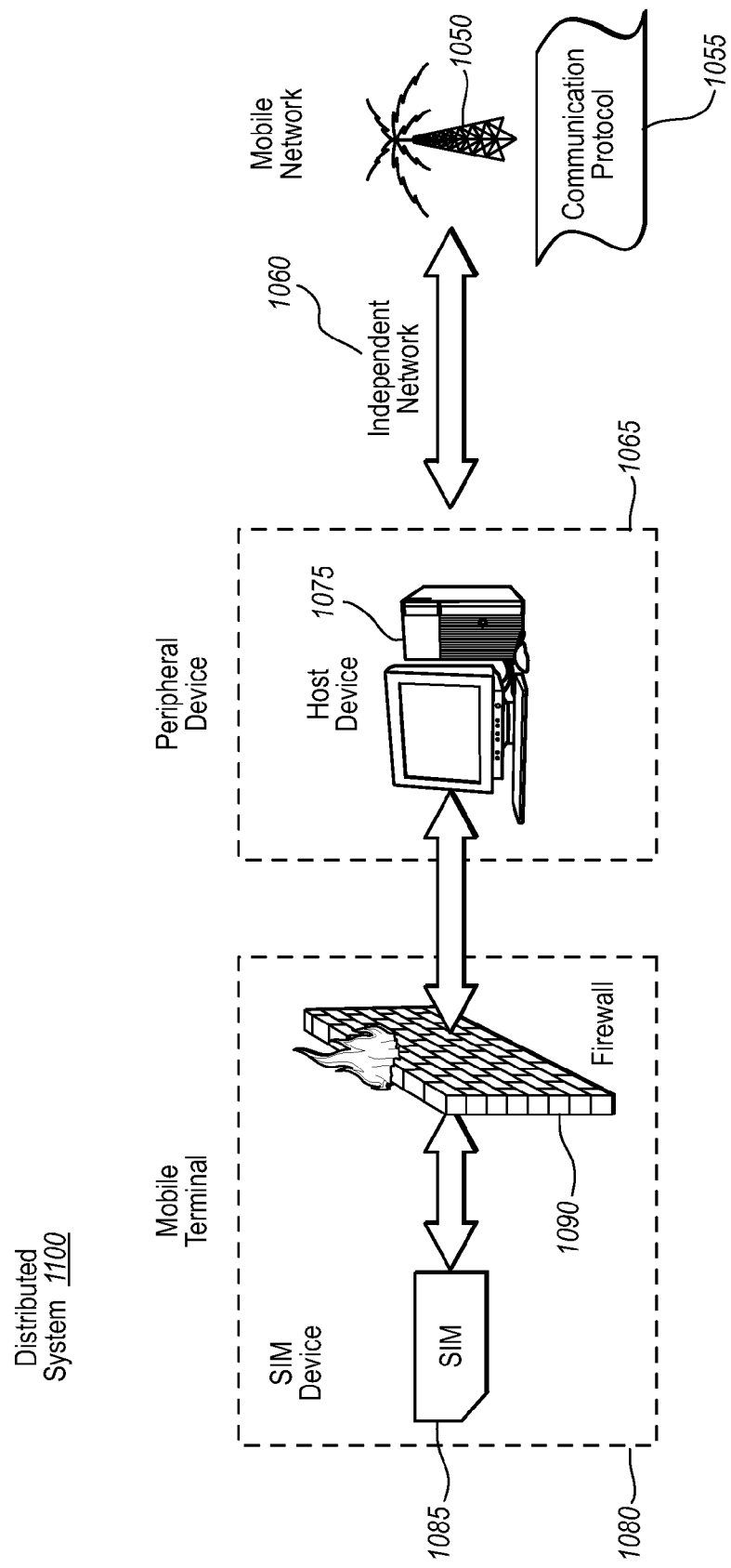
FIG. 11 illustrates a subscriber identity module (SIM) device configured with a firewall for conforming to established radio network communication protocols when used for commercial transactions in accordance with example embodiments.

Moreover, in order to comply with GSM, 3GPP, and other standards, additional requirements are placed on the terminal equipment, which will interact with the mobile module or SIM device. More specifically, the GSM, 3GPP, and other similar standards require that the SIM restrict access to certain types of information, including encryption keys, to the mobile terminal. In order to satisfy these requirements, embodiments herein provide an abstraction security profile that delegates processing and decoding of certain messages and security to the SIM device itself. For example, as shown in FIG. 11, a firewall 1090 defines a state machine and protocol messages for abstracting a SIM 1085 from a host device 1075 when communicating over an independent network 1060. More specifically, the firewall 1090 uses a formal state machine that limits or restricts the number and/or sequence of commands sent from a read driver within the host 1075 to the SIM 1085 itself. Accordingly, the SIM device 1080 (e.g., a cellular phone, SIM interface, etc.—note that "mobile module" represents a generic term for a "SIM", but is used herein interchangeably unless otherwise specifically claimed) becomes the mobile terminal and the host device 1075 becomes a peripheral that complies with the communication protocol 1055 for the mobile network 1050. The following describes in greater detail some of the state machines and protocols used to address some of the additional security requirements and concerns outlined above.

Embodiments herein define a security profile for authentication over the untrusted independent network (i.e., a network independent of a radio network corresponding to the mobile module's infrastructure or operator system) in terms of various security levels that a given security token may represent. These include, but are not limited to, device security level, network security level, user security level, and service security level. At each level are different requirements and procedures for obtaining a security token. Accordingly, as described in greater detail below, each security level represents a differing level of authentication in the security model and each has certain requirements and/or assurances. Further, it should be noted that each security level may or may not be independent of the others. For example, it may not be necessary to establish a device security level before a network or user security level can be achieved; however, for proper assurances such hierarchical procedure may be desirable.

A device security level indicates physical possession of a mobile module, e.g., a SIM device such as a cellular phone. A device token (i.e., a SIM security token with a device security level) is typically issued locally by the mobile module or SIM device upon proper authentication by a user thereto. Such requirements for authenticating a user to the mobile module are normally set by the mobile infrastructure or mobile operator. Further, device authentication is usually enforced by the SIM device, however, other embodiments may provide for the use of other components in the authentication process. For example, the SIM or other device may require a password before the mobile module or other device will issue a device token. Of course, other forms of credentials for authentication on the device level are also contemplated herein.

In one embodiment, a SIM device requires the client or host computer to authenticate or identify itself to the mobile module before a device security token will issue. Further, the lifetime of a device token is typically controlled by the mobile module or SIM device using policy set by the mobile infrastructure. In one embodiment, the lifetime or other requirements set by the mobile operator may be dynamically configured through the independent and/or radio network. If the device token does not have lifetime or other restrictions, typically the SIM does not require the user to re-authenticate to the mobile module more than once.

The network security level indicates an authenticated connection between the mobile module or SIM and the mobile infrastructure or network over the untrusted independent network. The network security level can be established without user presence or user interaction assuming an unlocked SIM device is accessible by the client or host computer. Typically, the network security level is a single factor authentication, which asserts proof of possession of the SIM device to the mobile infrastructure or operator. Typically, the mobile infrastructure will issue a network security token via an authentication server and through a challenge response type mechanism before issuing a network security token to a client or host computing device. This network security level token can then be used in subsequent authentication phases and provides transport level security to encrypt and/or sign further interactions between a client and an authentication server and/or mobile infrastructure.

Figure 7A:
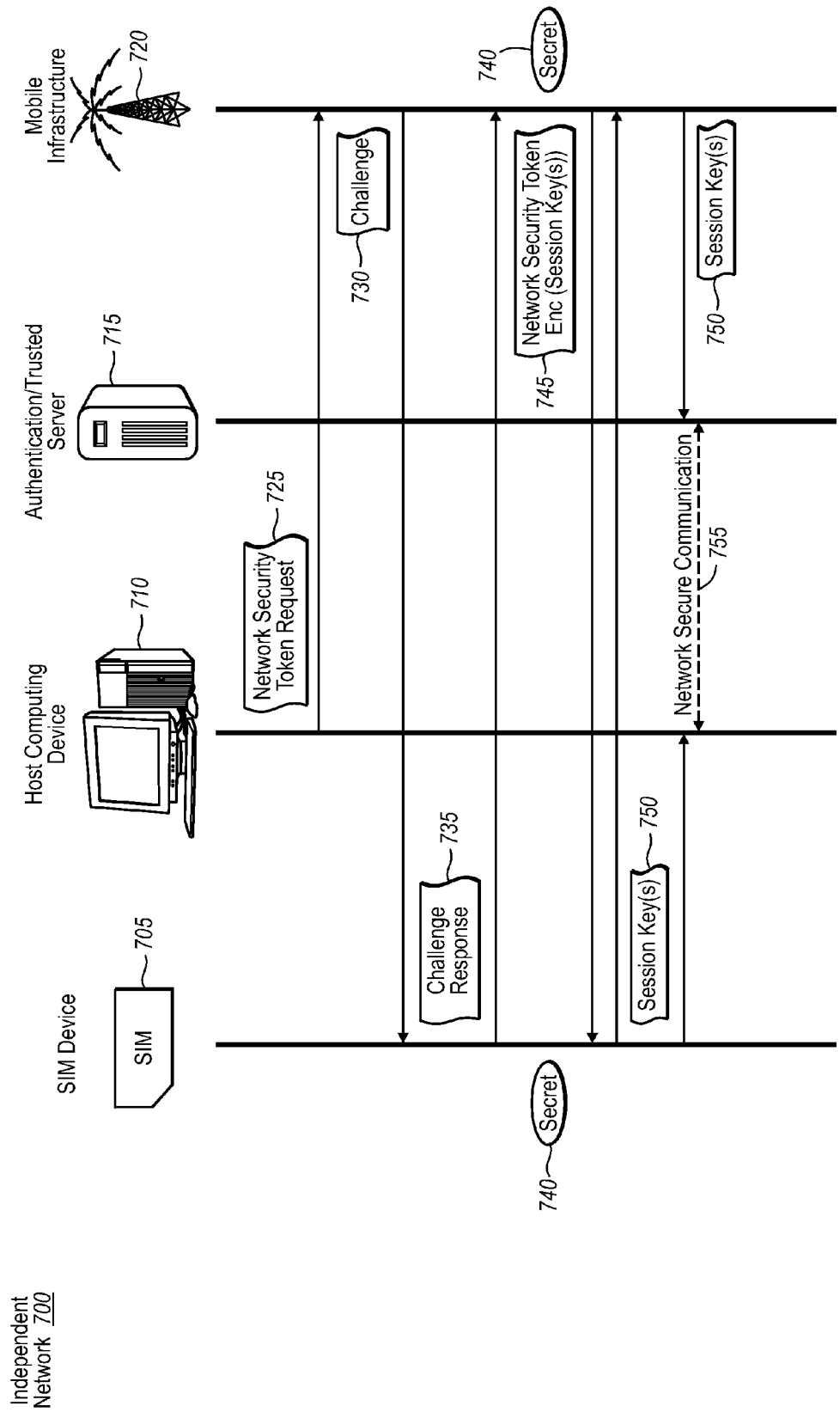
FIG. 7A illustrates a system used for authenticating a mobile module to a network for establishing a secure communication therewith in accordance with example embodiments.

FIG. 7A illustrates an independent network 700 configured to issue a network level security token for establishing a transport level secure communication between client and an authentication server. Typically, the client or host computing device 710 (which may be a personal computer, mobile phone, or other portable or non-mobile computing device) initiates the authentication request by sending a network security token request 725 to the mobile infrastructure 720 via the authentication/trusted server 715 (note, however, that the request may also be initiated by another device such as the SIM 705 itself). Usually, the request 725 will be unsigned when received by the authentication server 715, which can then sign and/or encrypt the request prior to sending to the mobile infrastructure 720 for validating that the request comes from the authentication server 715. The trusted server 715 can then query the mobile infrastructure 720 or mobile operator for a challenge 730, which will then be sent to the mobile module 705. The mobile module 705 uses a secret 740 shared between it and the mobile infrastructure 720 for generating a challenge response 735, which is then forwarded to the client 710—note that typically the secret will be SIM 705 specific and set by the mobile operator 720.

The client 710 will use the challenge response 735 to generate a request security token response, which may also include the SIM identity and the challenge 730 for authentication purposes. Typically, the client will request that the mobile module 705 sign and/or encrypt the request security token response with the device's 705 shared secret 740 or other key such as the SIM's device token—although this may or may not be necessary. The request security token response and the challenge response 735 therein can be validated using, e.g., the shared secret 740. Note, as previously mentioned, that the request security token response may or may not be signed and/or encrypted by the same key used to generate the challenge response 735. In any event, if the mobile infrastructure 720 validates the challenge response 735 (i.e., the challenge response is valid and the mobile module has an active billing account), the mobile infrastructure 720 and/or authentication server 715 can respond by generating a message that contains a network security token 745 with encrypted session key(s), which are signed and/or encrypted using the shared secret 740. The message can further be signed using either the authentication server's 715's own security token (e.g., X.509 cert, Kerberos cert, etc.) or using the mobile infrastructure's 720's security token. The client 710 can then verify the signed message and pass the encrypted network session key(s) to the SIM 705 for decryption. Using the shared secret 740, the mobile module 705 can then return the un-encrypted session key(s) 750 to the client 710.

Note that in the above issuance of the network security token 745, the mobile module 705 typically needs an active billing account in good standing on the mobile infrastructure 720. Accordingly, upon verification of the challenge response 735 and such active billing account information, a trust may be established between the SIM 705 and mobile infrastructure 720 creating a virtual secure channel. The session key(s) 750 are then delegated or passed from the mobile module 705 to the software platform or stack of the host computing device 710 and from the mobile operator 720 to the authentication server 715 (if necessary). Note the physical proximity of the mobile module 705 with the host computing device 710 (which may be connected thereto via USB port, Bluetooth, or other wireless or wired connection) and the trusted relationship between the mobile infrastructure 720 and the authentication server 715. These session key(s) 750 are then used by the client 710 and trusted server 715 for establishing a secure communication 755.

Note that there may be a second mode of operation for authenticating the mobile module 705, which may be used by the mobile infrastructure 720. In this case, the client host 710 may request that the SIM 705 generate and sign its own challenge (typically in the form of a Nonce). The client 710 can then attach the information as part of the device token when request the network security token 725 from the trusted server 715 or mobile infrastructure 720. If the mobile operator 720 can verify that the device token contains a valid challenge-response 735, it may directly issue a network token 745 back to the client 710 for decryption of session key(s) as described above.

As will be described in greater detail below, typically this network level security token 745 is required for allowing a client access to an authenticated service token, which can be used to request services and/or goods from third party services. Note also that in order to obtain the network token, the above presumes that the client or host computer device 710 has successfully determined the network endpoint for the authentication server 715 and/or mobile infrastructure 720. Additionally, it presumes that the client 710 and the user (not shown) have already authenticated to the SIM device 705. As described above, the network security level token 745 is used in subsequent authentication phases and provides transport level security to encrypt and sign further interactions between the client 710 and the trusted server 715. The lifetime of the network token 745 (and other tokens) is controlled by the authentication server 715 or mobile operator 720. Because the network token 745 servers as a session context between the SIM device 705 and the mobile infrastructure 720, the lifetime may be limited to hours or days, number of bytes passed, and/or may only be valid if the mobile module 705 is properly connected to the client 710.

As previously mentioned, a user security level indicates a user has authenticated to the network (the trusted server 715, mobile infrastructure 720, or other service) usually by providing information stored outside the SIM 705 or host computing device 710. Accordingly, the user security level in conjunction with the network security level establishes a multifactor authentication based on proof of possession of the SIM 705 and some outside knowledge (e.g., a user name/password). Typically, the trusted server 715 or the mobile infrastructure 720 are the only components to issue a user level security, however, in some instances a third party service may also issue such user tokens. Accordingly, the mobile infrastructure 720 (or other service as the case may be) will verify a user through a challenge response mechanism before issuing a user security level token back to client 710. Note that the user security token is used by the client to sign and/or encrypt requests for service tokens as described below. It may not be recommended for the client to send a user security token to any service other than the trusted server (since typically no other service will be able to verify/use it). As with the above network token 745, the user token may have a limited lifetime controlled by the mobile operator 720, and may be limited by time duration, the number of bytes passed, and/or by the existence of the connection between the mobile module 705 and the client 710.

Figure 7B:
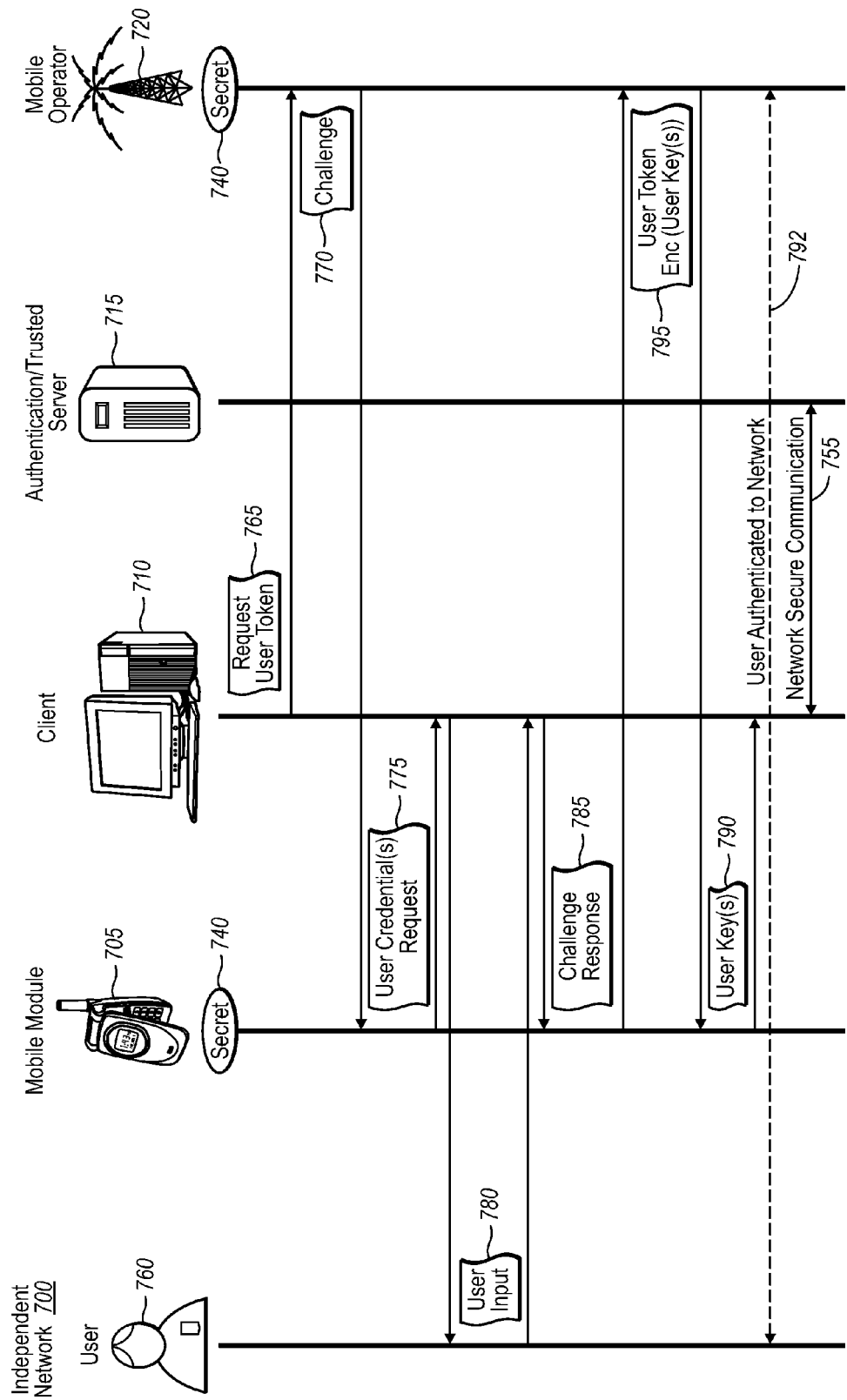
FIG. 7B illustrates a system used for authenticating a user to a network using a mobile module when establishing a secure communication channel in accordance with example embodiments.

FIG. 7B illustrates an independent network 700 configured to issue a user level security token for establishing a multi-level secure communication between client 710 and an authentication server 715. The user network authentication phase allows the mobile operator 720 (or other server) to verify that a known person is in possession of a known device 705. Effectively the user to network phase is a two factor authentication phase and prevents the network from distributed denial of service attacks. In addition, it protects the user by preventing a stolen SIM device 705 from being inappropriately used.

The host computing device 710 may issue a request for user token 765, which is sent to the mobile infrastructure 720 via the trusted server 715. Usually, the request 765 will be unsigned when received by the authentication/trusted server 715, which can then sign and/or encrypt the request prior to sending to the mobile infrastructure 720 for validating that the request comes from the authentication server 715. The trusted server 715 can then query the mobile infrastructure 720 or mobile operator for a challenge 770, which will then be sent to the mobile module 705. Note that the challenge 770 may be generated using a different algorithm than the challenge 730 used for authenticating the device 705 to the network. The client 710 will extract the challenge 770 from the token message and pass it to the mobile module 705, indicating that this is a user authentication. Accordingly, the SIM 705 will request user credential(s) 775 from the client 710. The host computer 710 will then query the user 760 for user input 780, and return it to the mobile module 705. The SIM 705 or client 710 may optionally decide that the user input 780 or credential(s) should be encrypted with the network security key (i.e., the session key(s) 750 previously obtained.

Using the user input 780, the mobile module 705 will generate a challenge response 785 and return it to the client 710, which will generate and send a request security token response that includes, e.g., a SIM identifier, the challenge 770, and the challenge response 785. Typically, the client 710 will request that the mobile module 705 sign and/or encrypt the request security token response with the network security token 745, the shared secret key 740, or a SIM 705 specific key. Similar to above, the request security token response and the challenge response 785 therein can be validated using, e.g., the shared secret 740, or other mobile module 705 specific key. Note, as previously mentioned, that the request security token response may or may not be signed and/or encrypted by the same key used to generate the challenge response 785. In any event, if the mobile infrastructure 720 validates the challenge response 785 (i.e., the user credentials provided are proper), the mobile infrastructure 720 and/or authentication server 715 can respond by generating a message that contains a user security token 795 with encrypted user key(s), which are signed and/or encrypted using the shared secret 740 or other device 705 specific key. The message can further be signed using either the authentication server's 715's own security token (e.g., X.509 cert, Kerberos cert, etc.) or using the mobile infrastructure's 720's security token. The client 710 can then verify the signed message and pass the encrypted user session key(s) to the SIM 705 for decryption. Using the shared secret 740 (or other key as the case may be), the mobile module 705 can then return the un-encrypted user key(s) 790 to the client 710; thus authenticating the user to the network 792.

The user to service authentication phase provides a mechanism for the mobile network operator 720 to provide authentication on behalf of third party services. Similar to the user to network security level, the user to service phase is a multi-factor authentication phase and prevents the network from issuing service tokens without a user 760 having been present during at least one phase of authentication. There are typically two modes of operation of the authentication server 715 regarding how service tokens are issued. First, if the user 760 has previously acquired a user token, the trusted server 715 may consider the user 760 to be authenticated and automatically issue a service token (provided that the request for service token is appropriately signed with the user token 790, 795. If, on the other hand, the mobile infrastructure 720 has not issued a user token 790, 795, the user 760 will be required to authenticate in a manner similar to that outlined above for requesting a user token 795, 790.

Figure 7C:
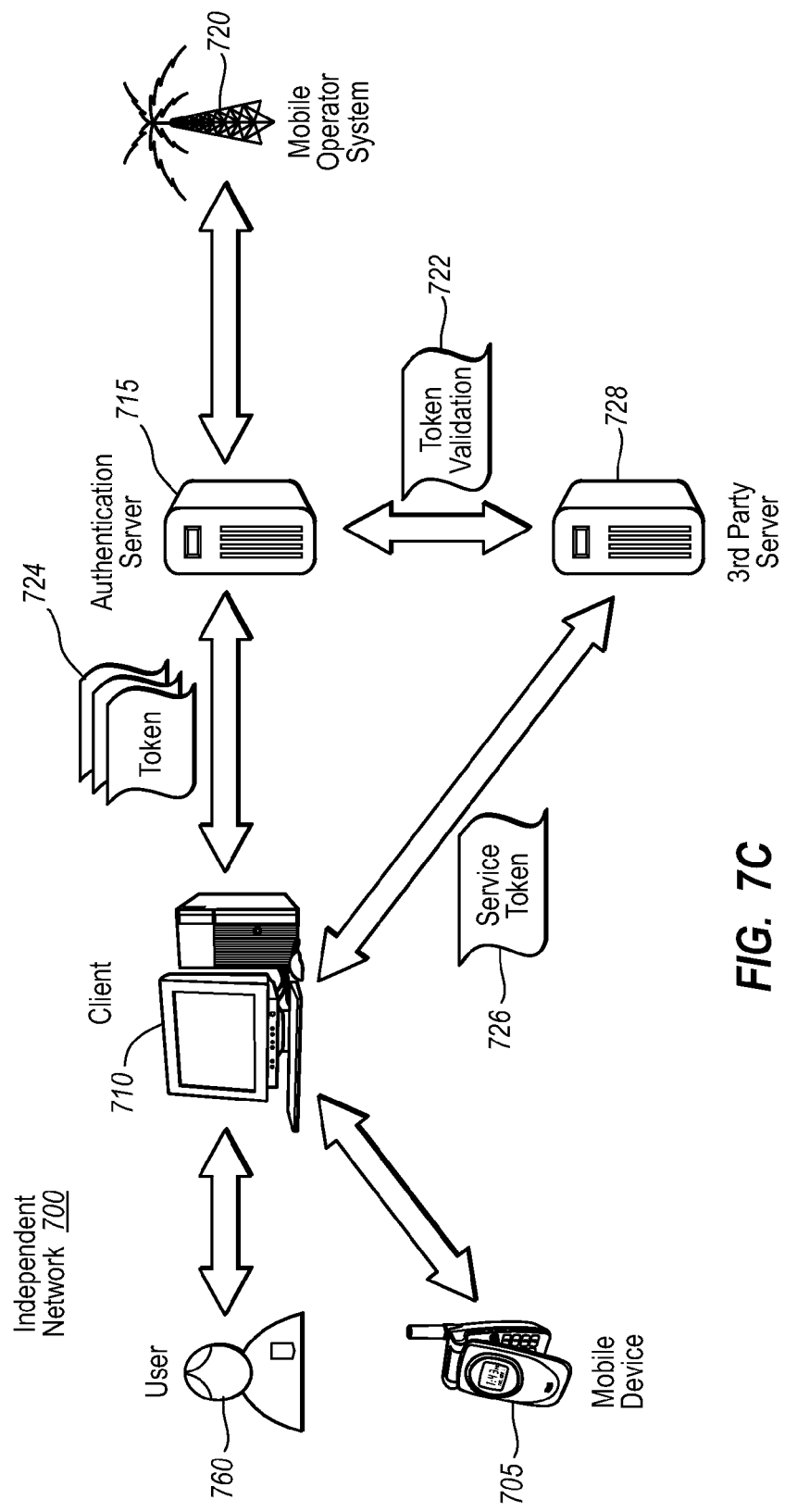
FIG. 7C illustrates a system configured for single or multilevel verification of various different services using a mobile module in accordance with example embodiments.

FIG. 7C illustrates how the various network entities communicate over the independent network 700 when establishing secure communication between a client 710 and third party server 728. As mentioned above, the mobile device 705 and user 760 can authenticate to the mobile operator system 720 as previously described. Accordingly, a secure communication exists between the authentication server 715 and the client 710 upon proper validation of a billing account for the mobile device 705 and authentication of possession thereof by the user 760. The trusted server 715 (or mobile infrastructure 720 as the case may be) can then issue service tokens 724 for various services when, e.g., the client 710 wishes to purchase services and/or goods from a third party service 728. Accordingly, the client 710 can issue a service token 726 to the third party server, which then validates the token 722 through the authentication server 715. Note that the third party server 728 may or may not require additional authentication and can use various mechanisms as previously described for performing such validation. Also note that the use of the service token 726 not only establishes a secure communication between the client 710 and third party server 728, but may also indicate the user's 760's ability to pay for one or more services and/or goods in a manner similar to that previously described.

Note that typically up until the service token is issued to the client 710, the security tokens issued are of no value to any other service other than the authentication server 715. The reason is that the security hierarchy can prevent any outside party from properly decoding a device token, a network token, or even a user token, as they all derive from the root or shared key 740 known only to the SIM device 705 and the mobile infrastructure 720. It is typically after the authentication server 715 issues a service token 724 that an arbitrary third party 728 web service can make use of a security token 724. Also note that the above security tokens and messages (e.g., challenges, challenge responses, etc.) may take on various formats or schemas. For example, the tokens and/or messages may be XML, binary, or other similar encoding format, which can be issued by the mobile operator 720 who may or may not wish to expose certain elements of the network to SIM communications to intermediate parties.

The above use of a portable hardware device 705 for authentication, identity, and/or payment validation can be used for purchasing online or local retail service and/or goods (e.g., online newspaper, music, software application, or other goods and service) or for an allowing access to an application running on the local PC or client 710 (e.g., Word®, Adobe Photoshop, Print program, pay-as-you go software, etc.). Accordingly, the above embodiments are especially advantageous for unlocking freely distributed protected software or content (e.g., music, videos, games, etc.) on a plurality of hosting devices 710. In other words, a license now becomes tied to the portable mobile device 705, which can be authenticated as described above allowing for a portable digital identity not tied to a limited set of computing devices. As such a user 760 goes to a friend's house and does not have to bring all of his/her programs or other protected content; it's all accessible and authenticated via the portable device 705.

As should be appreciated from the foregoing, there are numerous aspects of the present invention described herein that can be used independently of one another, including the aspects that relate to identity tokens, payment tokens, selecting one of a number of identity providers, selecting one of a number of payment providers, and the presence of commercial transaction software on an end-user system, a service provider system, an identity provider system, and a payment provider system. It should also be appreciated that in some embodiments, all of the above-described features can be used together, or any combination or subset of the features described above can be employed together in a particular implementation, as the aspects of the present invention are not limited in this respect.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

It should be appreciated that the various methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code. In this respect, it should be appreciated that one embodiment of the invention is directed to a computer-readable medium or multiple computer-readable media (e.g., a computer memory, one or more floppy disks, compact disks, optical disks, magnetic tapes, etc.) encoded with one or more programs that, when executed, on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above.

It should be understood that the term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs that, when executed, perform methods of the present invention need not reside on a single computer or processor, but may be distributed in a modular fashion amongst a number of different computers or processors to implement various aspects of the present invention.

Various aspects of the present invention may be used alone, in combination, or in a variety of arrangements not specifically discussed in the embodiments described in the foregoing, and the aspects of the present invention described herein are not limited in their application to the details and arrangements of components set forth in the foregoing description or illustrated in the drawings. The aspects of the invention are capable of other embodiments and of being practiced or of being carried out in various ways. Various aspects of the present invention may be implemented in connection with any type of network, cluster or configuration. No limitations are placed on the network implementation. Accordingly, the foregoing description and drawings are by way of example only.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalent thereof as well as additional items.

We claim:

1. At a first computing device in a distributed network environment, a method of authenticating the first computing device to a second computing device using a mobile module of a third computing device which is connected to the first computing device, the method, which is performed by the first computing device, comprising:

obtaining a network security token to establish transport level secure communication between a first computing device and a second computing device by performing the following:

sending a request for the network security token to the mobile infrastructure via the second computing device over the network other than the radio network of the mobile infrastructure;

receiving at the first computing device a network level challenge response from the mobile module;

in response to the network level challenge, creating at the first computing device a response;

sending the response from the first computing device to the mobile infrastructure;

receiving at the first computer a network security token;

sending from the first computer encrypted session keys to the mobile module;

receiving at the first computer unencrypted session keys from the mobile module; and establishing with the network security token a multilevel secure communication between the first computing device and the second computing device by performing the following:

sending a request for a user token to the mobile infrastructure via the second computing device over the network other than the radio network of the mobile infrastructure;

receiving at the first computing device a challenge from the mobile infrastructure;

sending from the first computing device the received challenge to a mobile module of the third computing device;

receiving at the first computing device a request for user credentials from the mobile module;

at the first computing device prompting the user for and receiving the credentials;

sending from the first computing device the credentials to the mobile module;

receiving at the first computing device a challenge response sent from the mobile module;

in response to the challenge, creating at the first computing device a response, and signing or encrypting the response with the network security token;
sending the response from the first computing device to the mobile infrastructure;
receiving at the first computing device a user token from the mobile infrastructure that includes encrypted user keys;
sending from the first computing device the encrypted user keys to the mobile module;
receiving at the first computing device unencrypted user keys from the mobile module; and
at the first computing device, signing or encrypting one or more requests with the unencrypted user keys;
sending from the first computing device to the second computing device the one or more requests;
in response to the one or more requests, the first computing device receiving from the second computing device one or more service tokens.

2. The method of claim 1 wherein the mobile module is a subscriber identity module (SIM) card.

3. The method of claim 1 wherein the third computing device is connected to the first computing device via one of a wired or wireless connection.

4. The method of claim 3 wherein the wired connection is a USB connection and the wireless connection is a Bluetooth connection.

5. The method of claim 1 wherein the network is the internet.

6. The method of claim 1 wherein the credentials are encrypted using the session keys that were received in the network security token.

7. The method of claim 1, further comprising:
receiving one or more service tokens from the second computing device.

8. The method of claim 7, wherein at least one of the one or more service tokens includes information that identifies the mobile module.

9. The method of claim 7, wherein at least one of the one or more service tokens includes information regarding the identity of the user.

10. The method of claim 7, wherein at least one of the one or more service tokens includes information that verifies the ability of the user to pay for services provided by a third party server.

11. The method of claim 7, further comprising:
sending at least one of the one or more service tokens to a third party server to authenticate the identity of the user in a request to access a service provided on the third party server.

12. One or more computer storage media, each comprising hardware storing computer executable instructions which when executed by a processor perform a method, on a first computing device in a distributed network environment, for authenticating the first computing device to a second computing device using a mobile module of a third computing device which is connected to the first computing device, the method comprising:
obtaining a network security token to establish transport level secure communication between a first computing device and a second computing device by performing the following:
sending a request for the network security token to the mobile infrastructure via the second computing device over the network other than the radio network of the mobile infrastructure;
receiving at the first computing device a network level challenge response from the mobile module;
in response to the network level challenge, creating at the first computing device a response;
sending the response from the first computing device to the mobile infrastructure;
receiving at the first computer a network security token;
sending from the first computer encrypted session keys to the mobile module;
receiving at the first computer unencrypted session keys from the mobile module; and
establishing with the network security token a multilevel secure communication between the first computing device and the second computing device by performing the following:
sending a request for a user token to the mobile infrastructure via the second computing device over the network other than the radio network of the mobile infrastructure;
receiving at the first computing device a challenge from the mobile infrastructure;
sending from the first computing device the received challenge to a mobile module of the third computing device;
receiving at the first computing device a request for user credentials from the mobile module;
at the first computing device prompting the user for and receiving the credentials;
sending from the first computing device the credentials to the mobile module;
receiving at the first computing device a challenge response sent from the mobile module;
in response to the challenge, creating at the first computing device a response, and signing or encrypting the response with the network security token ;
sending the response from the first computing device to the mobile infrastructure;
receiving at the first computing device a user token from the mobile infrastructure that includes encrypted user keys;
sending from the first computing device the encrypted user keys to the mobile module;
receiving at the first computing device unencrypted user keys from the mobile module; and
at the first computing device, signing or encrypting one or more requests with the unencrypted user keys;
sending from the first computing device to the second computing device the one or more requests;
in response to the one or more requests, the first computing device receiving from the second computing device one or more service tokens.

13. The one or more computer storage media of claim 12 wherein the mobile module is a subscriber identity module (SIM) card.

14. The one or more computer storage media of claim 12 wherein the third computing device is connected to the first computing device via one of a wired or wireless connection.

15. The one or more computer storage media of claim 14 wherein the wired connection is a USB connection and the wireless connection is a Bluetooth connection.

16. The one or more computer storage media of claim 12 wherein the network is the internet.

17. The one or more computer storage media of claim 12 wherein the credentials are encrypted using the session keys that were received in the network security token.

18. The one or more computer storage media of claim 12, wherein the stored computer executable instructions when executed by the processor further perform the following:

receiving one or more service tokens from the second computing device.

19. The one or more computer storage media of claim 18, wherein at least one of the one or more service tokens includes information that identifies the mobile module.

20. The one or more computer storage media of claim 18, wherein at least one of the one or more service tokens includes information regarding the identity of the user.

21. The one or more computer storage media of claim 18, wherein at least one of the one or more service tokens includes information that verifies the ability of the user to pay for services provided by a third party server.

22. The one or more computer storage media of claim 18, wherein the stored computer executable instructions when executed by the processor further perform the following:
sending at least one of the one or more service tokens to a third party server to authenticate the identity of the user in a request to access a service provided on the third party server.

* * * * *